United States Patent
Campbell et al.

(10) Patent No.: US 7,818,849 B2
(45) Date of Patent: Oct. 26, 2010

(54) STRESS REDISTRIBUTING CABLE TERMINATION

(76) Inventors: Richard V. Campbell, 4082 Forsythe Way, Tallahassee, FL (US) 32309; Kevin J. Barefield, 205 E. 6th Ave., Havana, FL (US) 32333; John Wiley Horton, 430 Sabuma Ave., Monticello, FL (US) 32344

( * ) Notice: Subject to any disclaimer, the term of this patent is extended or adjusted under 35 U.S.C. 154(b) by 795 days.

(21) Appl. No.: 11/651,753

(22) Filed: Jan. 10, 2007

(65) Prior Publication Data
US 2007/0107927 A1 May 17, 2007

Related U.S. Application Data

(63) Continuation of application No. 11/051,759, filed on Feb. 4, 2005, now abandoned.

(51) Int. Cl.
*F16G 11/00* (2006.01)
*A44B 21/00* (2006.01)

(52) U.S. Cl. .................... 24/129 R; 24/122.6; 24/136; 403/371; 52/223.13

(58) Field of Classification Search .................. None
See application file for complete search history.

(56) References Cited

U.S. PATENT DOCUMENTS 4,184,784 A * 1/1980 Killian ................. 403/267

FOREIGN PATENT DOCUMENTS

DE 2122463 11/1972

* cited by examiner

*Primary Examiner*—Jack W. Lavinder
(74) *Attorney, Agent, or Firm*—J. Wiley Horton

(57) ABSTRACT

A termination anchor having a neck region, a mid region, and a distal region. An expanding passage through the anchor from the neck region to the distal region is bounded by an internal surface. Exposed strands on a cable are trapped within this expanding passage by infusing them with liquid potting compound (either before or after the strands are placed within the passage). This liquid potting compound solidifies while the strands are within the anchor to form a solidified potted region. The present invention optimizes the profile of the internal surface in order to transfer stress occurring in the neck region to the mid region and the distal region. By transferring some of this stress, a more uniform stress distribution and a lower peak stress are achieved.

20 Claims, 35 Drawing Sheets

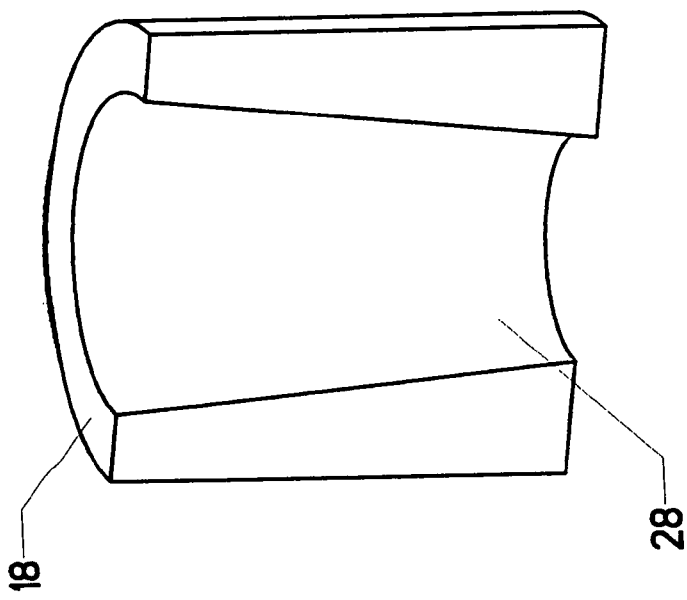
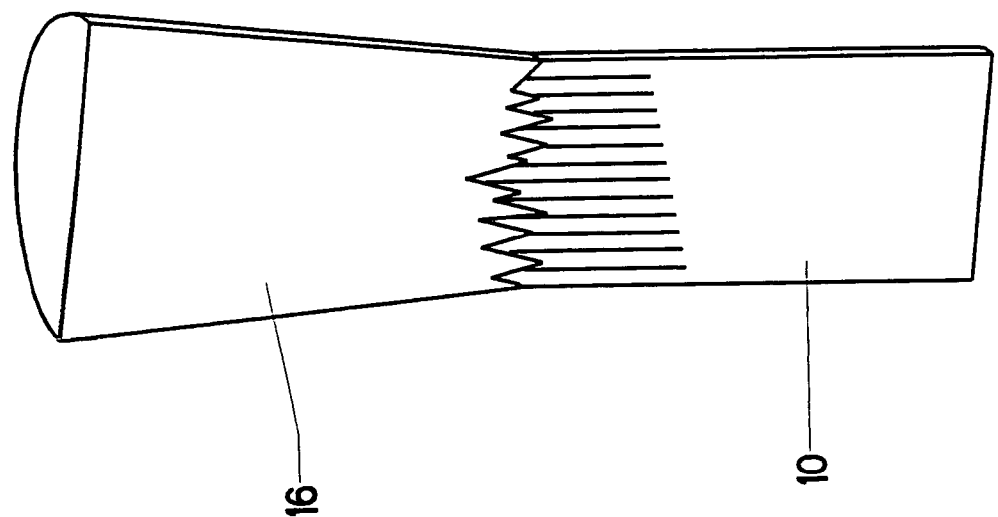
FIG. 3
(PRIOR ART)

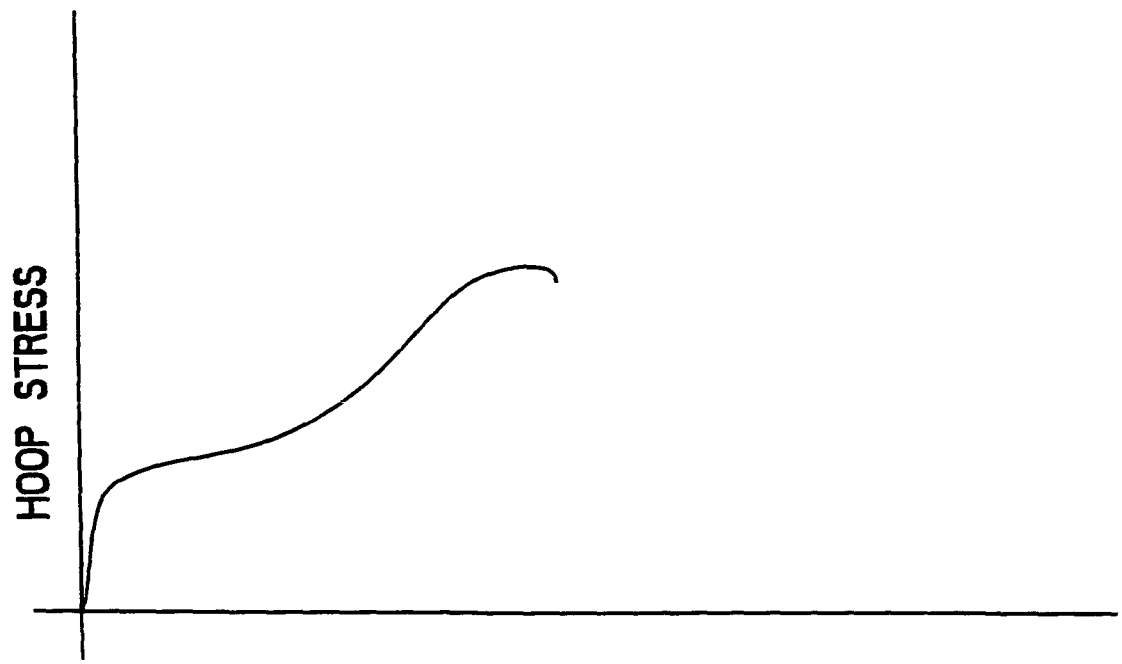
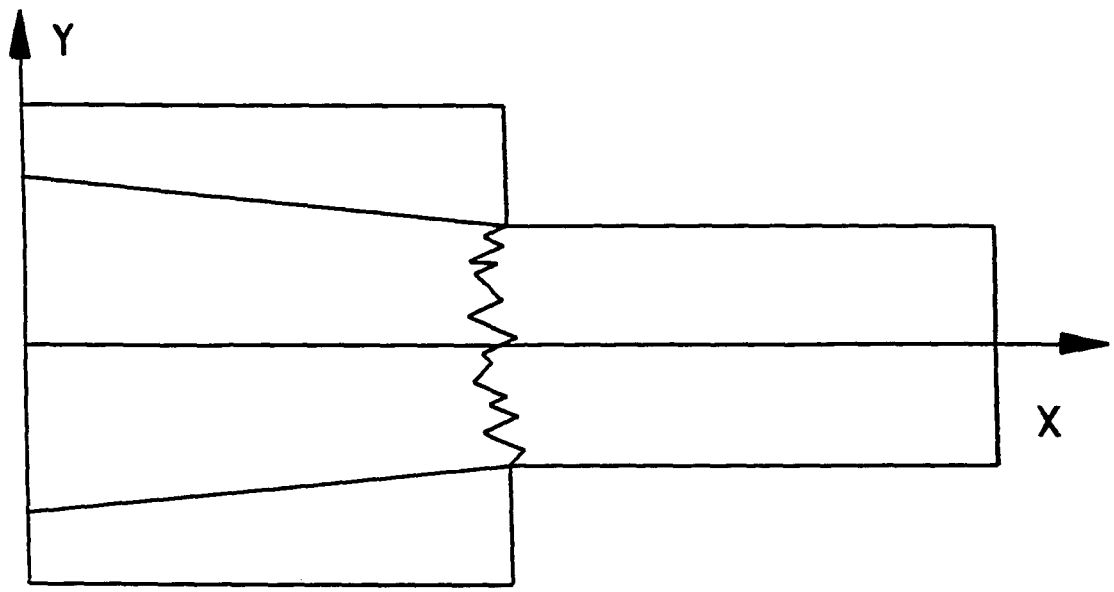
FIG. 10
(PRIOR ART)

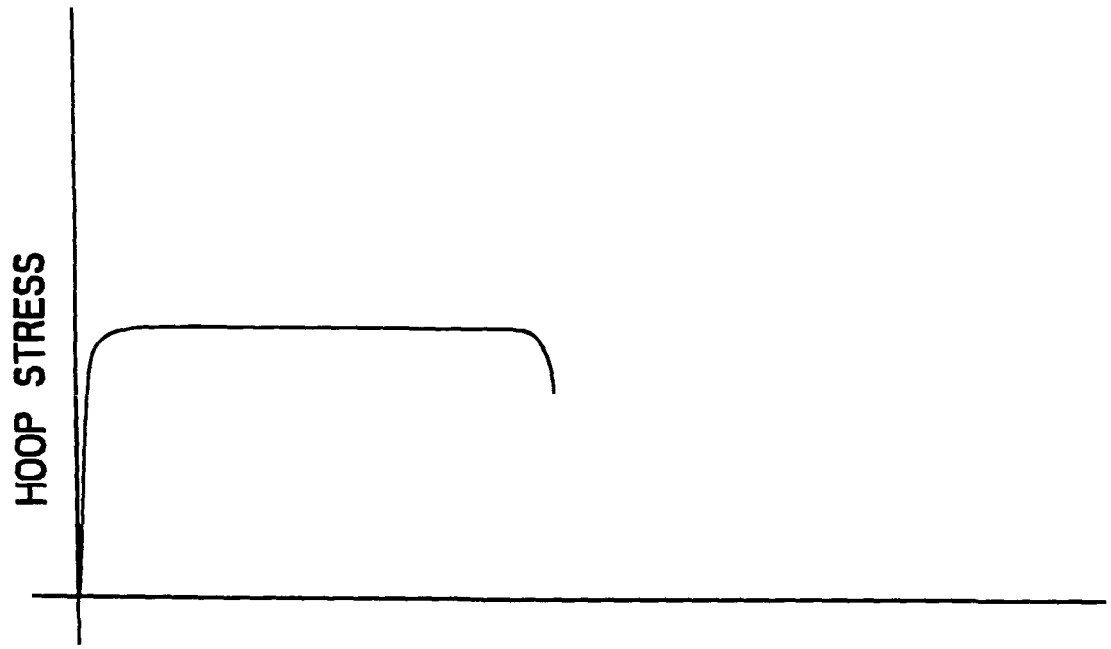
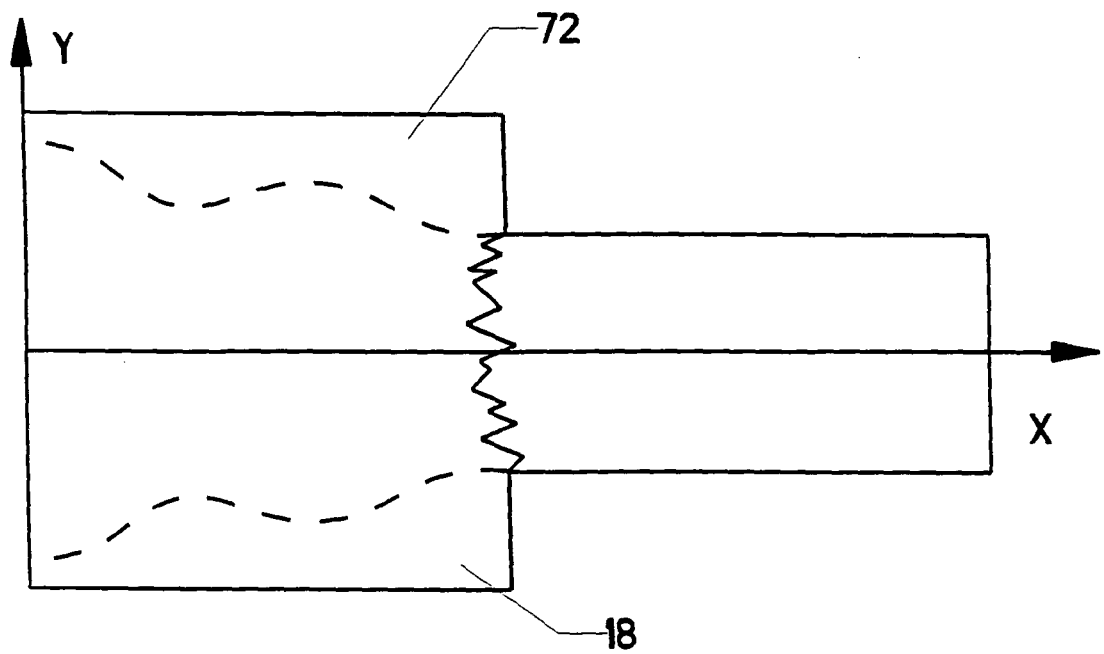
FIG. 11

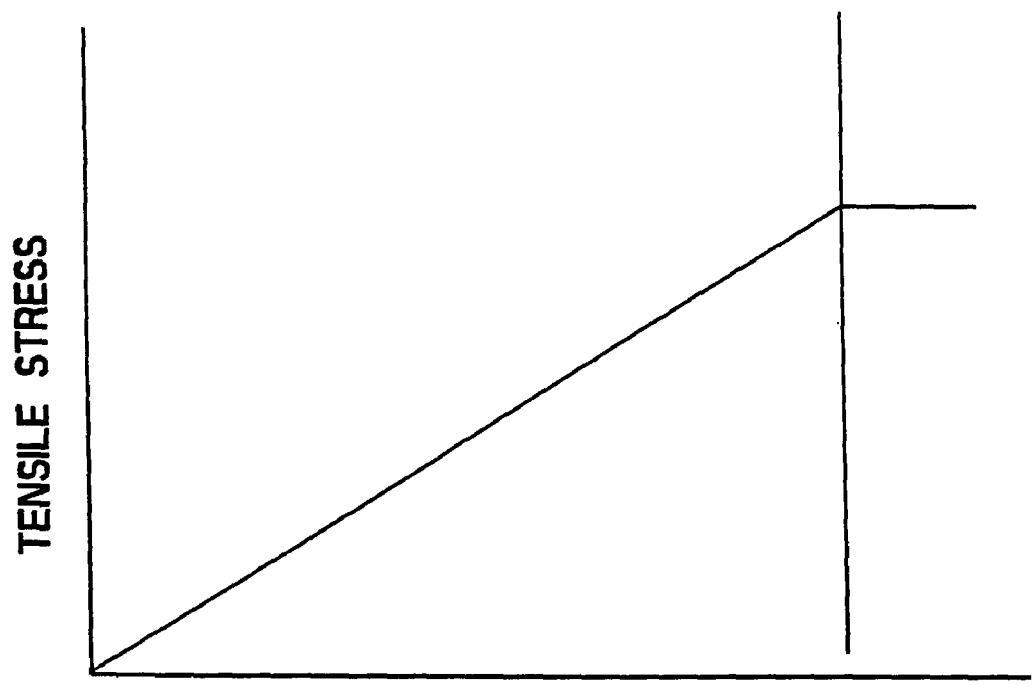
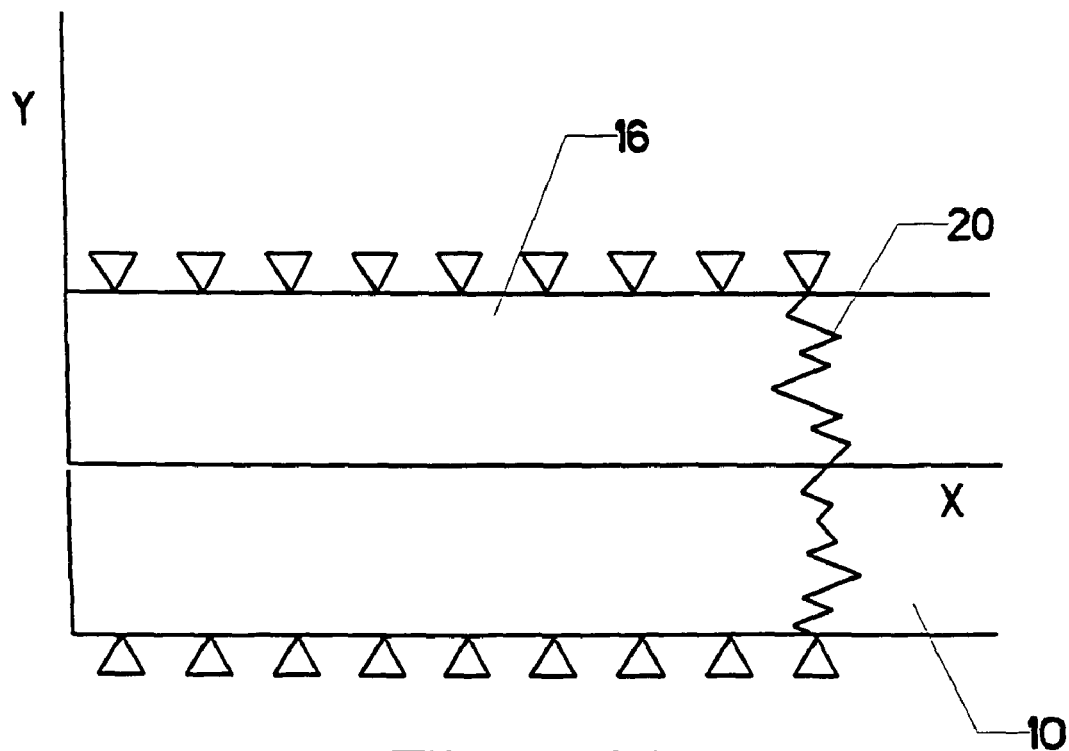
FIG. 18

STRESS REDISTRIBUTING CABLE TERMINATION

CROSS-REFERENCES TO RELATED APPLICATIONS

This non-provisional patent application is a continuation of an earlier-filed non-provisional patent application having Ser. No. 11/051,759. The earlier application listed the same inventors and had a filing date of Feb. 4, 2005 now abandoned.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of cables and cable terminations. More specifically, the invention comprises a cable termination which redistributes stress in order to enhance the mechanical properties of the termination.

2. Description of the Related Art

Devices for mounting a termination on the end of a wire, rope, or cable are disclosed in detail in U.S. application Ser. No. 60/404,973 to Campbell, which is incorporated herein by reference. The individual components of a wire rope are generally referred to as "strands," whereas the individual components of natural-fiber cables or synthetic cables are generally referred to as "fibers." For purposes of this application, the term "strands" will be used generically to refer to both.

In order to carry a tensile load an appropriate connective device must be added to a cable. A connective device is typically added to an end of the cable, but may also be added at some intermediate point between the two ends. FIG. 1 shows a connective device which is well known in the art. FIG. 2 shows the same assembly sectioned in half to show its internal details. Anchor 18 includes tapered cavity 28 running through its mid portion. In order to affix anchor 18 to cable 10, the strands proximate the end of cable 10 are exposed and placed within tapered cavity 28 (They may also be splayed or fanned to conform to the expanding shape of the tapered cavity).

Liquid potting compound is added to the region of strands lying within the anchor (either before or after the strands are placed within the anchor). This liquid potting compound solidifies while the strands are within the anchor to form potted region 16 as shown in FIG. 2. Most of potted region 16 consists of a composite structure of strands and solidified potting compound. Potting transition 20 is the boundary between the length of strands which is locked within the solidified potting compound and the freely-flexing length within the rest of the cable.

The unified assembly shown in FIGS. 1 and 2 is referred to as a "termination" (designated as "14" in the view). The mechanical fitting itself is referred to as an "anchor" (designated as "18" in the view). Thus, an anchor is affixed to a cable to form a termination. These terms will be used consistently throughout this disclosure.

Cables such as the one shown in FIG. 2 are used to carry tensile loads. When a tensile load is placed on the cable, this load must be transmitted to the anchor, and then from the anchor to whatever component the cable attaches to (typically through a thread, flange, or other fastening feature found on the anchor). As an example, if the cable is used in a winch, the anchor might include a large hook.

Those skilled in the art will realize that potted region 16 is locked within anchor 18 by the shape of tapered cavity 28. FIG. 3 is a sectional view showing the potted region removed from the anchor. As shown in FIG. 3, tapered cavity 28 molds the shape of potted region 16 so that a mechanical interference is created between the two conical surfaces. When the potted region first solidifies, a surface bond is often created between the potted region and the wall of the tapered cavity. When the cable is first loaded, the potted region is pulled downward (with respect to the orientation shown in the view) within the tapered cavity. This action is often referred to as "seating" the potted region. The surface bond typically fractures. Potted region 16 is then retained within tapered cavity 28 solely by the mechanical interference of the mating male and female conical surfaces.

FIG. 4 shows the assembly of FIG. 3 in an elevation view. As mentioned previously, the seating process places considerable shearing stress on the surface bond, which often breaks. Further downward movement is arrested by the compressive forces exerted on the potted region by the tapered cavity (Spatial terms such as "downward", "upper", and "mid" are used throughout this disclosure. These terms are to be understood with respect to the orientations shown in the views. The assemblies shown can be used in any orientation. Thus, if a cable assembly is used in an inverted position, what was described as the "upper region" herein may be the lowest portion of the assembly). The compressive stress on potted region 16 tends to be maximized in neck region 22. Flexural stresses tend to be maximized in this region as well, since it is the transition between the freely flexing and rigidly locked regions of the strands.

The tensile stresses within potted region 16 likewise tend to be maximized in neck region 22, since it represents the minimum cross-sectional area. Thus, it is typical for terminations such as shown in FIGS. 1-4 to fail within neck region 22.

In FIG. 4, potted region 16 is divided generally into neck region 22, mid region 24, and distal region 26. Potting transition 20 denotes the interface between the relatively rigid potted region 16 and the relatively freely flexing flexible region 30. Stress is generally highest in neck region 22, lower in mid region 24, and lowest in distal region 26. A simple stress analysis explains this phenomenon.

Considering the stress placed on a thin transverse "slice" within the potted region is helpful. FIG. 5 shows thin section 60 within potted region 16. The potted region is held within a corresponding tapered cavity in an anchor. Seating force 62 pulls the potted region to the right in the view, thereby compressing the potted region.

FIG. 6 graphically illustrates the seating phenomenon. A coordinate system is established for reference. The X Axis runs along the center axis of anchor 18. Its point of origin lies on the anchor's distal extreme (distal to the neck region). The Y Axis is perpendicular to the X Axis. Its point of origin is the same as for the X Axis.

The thin section starts at unseated position 64. However, once seating force 62 is applied, the thin section moves to the right to seated position 66. The section moves through a distance $\Delta X$. Significantly, the thin section is transversely compressed a distance $\Delta Y$. It must be compressed since the wall of tapered cavity 28 slopes inward as the thin section moves toward the neck region. The reader should note that the seating movement is exaggerated in the view for visual clarity.

FIG. 7 shows a plan view of the thin section. Unseated position 64 is shown in dashed lines. Seated position 66 is shown as solid. The thin section actually has a conical side wall (matching the slope of tapered cavity 28 within anchor 18). However, for a thin section this side wall can be approximated as a perpendicular wall without the introduction of significant error. With this assumption, the thin section becomes a very short cylinder, having a volume of $\pi \cdot r^2 h$, with h being the thickness of the section (or, in other words, the height of the very short cylinder).

In FIG. 7, $Y_1$ is the radius of the thin section in unseated position 64, while $Y_2$ is the radius of the thin section in seated position 66. The volume of the section in the unseated position is $\pi \cdot Y_1^2 \cdot h$, while the volume of the seated position is $\pi \cdot Y_2^2 \cdot h$. A simple expression for compressive strain based on volume reduction is as follows:

$$\varepsilon = \frac{(\pi \cdot Y_1^2 - \pi \cdot Y_2^2) \cdot h}{\pi \cdot Y_1^2 \cdot h} = 1 - \frac{Y_2^2}{Y_1^2}$$

The hoop stress occurring within the thin section is linearly proportional to the compressive hoop strain (or very nearly so). Thus, the hoop stress in the thin section can be expressed as:

$$\sigma_{hoop} \approx k_1 \cdot \left(1 - \frac{Y_2^2}{Y_1^2}\right),$$

where $k_1$ is a scalar.

Consider now the situation depicted graphically in FIGS. 8 and 9. The same anchor is used. The same tapered cavity having a straight side wall is used. In this analysis, however, two separate thin sections will be considered. Distal thin section 68 lies distal to the potting transition in the region of the neck. Neck thin section 70 lies within the neck region proximate the potting transition. If tension is placed on the cable while the anchor is held in place, the potted region will "seat" by shifting to the right in the view. Each of the thin sections therefore has an unseated position 64 (shown in dashed lines) and a seated position 66 (shown in solid lines).

FIG. 9 shows a plan view of distal thin section 68 and neck thin section 70. Again, the unseated position for both is shown in dashed lines while the seated positions are shown in solid lines. Because of the straight side wall within the anchor, the radius of both thin sections is reduced an amount $\Delta Y$. However, the reduction in area of the two sections will not be the same. The reader will recall from the prior expression that the hoop strain may be expressed as:

$$\varepsilon = 1 - \frac{Y_2^2}{Y_1^2}$$

Applying this equation to the two sections shown in FIG. 9, one may easily see that the smaller section (neck thin section 70) undergoes a greater strain than does the larger section (distal thin section 68), for a given amount of seating. A quick analysis using actual numbers makes this point more clear. Assume that the radius of neck thin section 70 in the unseated position is 0.250, while the unseated radius of distal thin section 68 is 0.350. Further assume that the seating movement produces a $\Delta Y$ of 0.020. The strain for neck thin section 70 would be $$1 - \frac{.23^2}{.25^2} = .1536.$$

The strain for distal thin section 68 would be $$1 - \frac{.33^2}{.35^2} = .1110.$$

Thus, for a given amount of seating, the hoop strain increases when proceeding from the distal region to the neck region. Since the hoop stress is approximately linearly proportional to the hoop strain, the hoop stress is likewise increasing. FIG. 10 shows a representative plot of hoop stress plotted against position along the X Axis (the centerline of the cavity within the anchor). The reader will observe the stress concentration in the neck region. This stress concentration is undesirable, and represents a limitation of the prior art design. Thus, a goal of the present invention is to redistribute stress from the neck region to the mid and distal regions.

BRIEF SUMMARY OF THE PRESENT INVENTION

The present invention comprises a cable termination which redistributes stress. The termination includes an anchor having a neck region, a mid region, and a distal region. An expanding passage through the anchor from the neck region to the distal region is bounded by an internal surface. Exposed strands on a cable are trapped within this expanding passage by infusing them with liquid potting compound (either before or after the strands are placed within the passage). This liquid potting compound solidifies while the strands are within the anchor to form a solidified potted region.

When the cable is placed in tension, the forces generated are passed from the potted region to the internal surface of the expanding passage and from thence to the anchor. The shape of the internal surface influences the nature of this force transmission, thereby influencing the distribution of stress within the potted region itself. The present invention optimizes the profile of the internal surface in order to transfer stress occurring in the neck region to the mid region and the distal region. By transferring some of this stress, a more uniform stress distribution and a lower peak stress are achieved.

The present invention includes logarithmic curves, natural logarithmic curves, third order curves, and higher order curves used to generate an optimized profile. It also includes combinations of simpler expressions, such as arcs and second order curves, which can be used to closely approximate the optimized profile.

BRIEF DESCRIPTION OF THE SEVERAL VIEWS OF THE DRAWINGS

FIG. 3 is a sectioned perspective view, showing internal features of a prior art termination.

FIG. 10 is a plot view, showing the distribution of hoop stress within the potted region.

FIG. 11 is a plot view, showing the desired theoretical distribution of hoop stress within the potted region.

FIG. 18 is a plot view, showing tensile stress distribution within the potted region.

REFERENCE NUMERALS IN THE DRAWINGS

| | | | |
|---|---|---|---|
| 10 | cable | 14 | termination |
| 16 | potted region | 18 | anchor |
| 20 | potting transition | 22 | neck region |
| 24 | mid region | 26 | distal region |
| 28 | tapered cavity | 30 | flexible region |
| 32 | shoulder | 34 | serration |
| 36 | semicircular recess | 38 | straight portion |
| 40 | undulation | 42 | increased taper ledge |
| 44 | protrusion | 46 | recess |
| 48 | threaded portion | 50 | ring recess |
| 52 | step | 54 | gap |
| 56 | cross pin | 58 | through hole |
| 60 | thin section | 62 | seating force |
| 64 | unseated position | 66 | seated position |
| 68 | distal thin section | 70 | neck thin section |
| 72 | optimized profile | 74 | hoop stress optimized curve |
| 76 | hoop stress optimized anchor | 78 | parabolic approximation |
| 80 | constant radius curve | 82 | analysis element |
| 84 | tensile stress modifier curve | 86 | composite curve |
| 88 | diameter boundary | 90 | fillet |
| 92 | stress optimized anchor | 94 | splayed strands |
| 96 | distal anchor boundary | 98 | neck anchor boundary |
| 100 | dome shape | 102 | third order curve |
| 104 | parabolic curve | 106 | straight neck portion |
| 108 | tangency point | 110 | straight conic portion |
| 112 | higher order composite curve | 114 | first parabolic curve |
| 116 | second parabolic curve | 118 | first arc |
| 120 | second arc | | |

DESCRIPTION OF THE INVENTION

FIG. 11 graphically depicts one objective of the present invention. Anchor 18 includes an internal passage bounded by an internal surface. The internal surface is created by a revolved profile. Optimized profile 72—represented by the dashed lines in the lower view—is an undefined shape which will create an ideally uniform stress distribution for the potted region. This idealized stress distribution is shown in the upper view of FIG. 11. The optimized profile represents the shape which will most closely approximate the ideal uniform stress distribution. In reality, a completely flat stress curve is not possible. Thus, this diagram represents a goal rather than an expected result.

Figure 19:
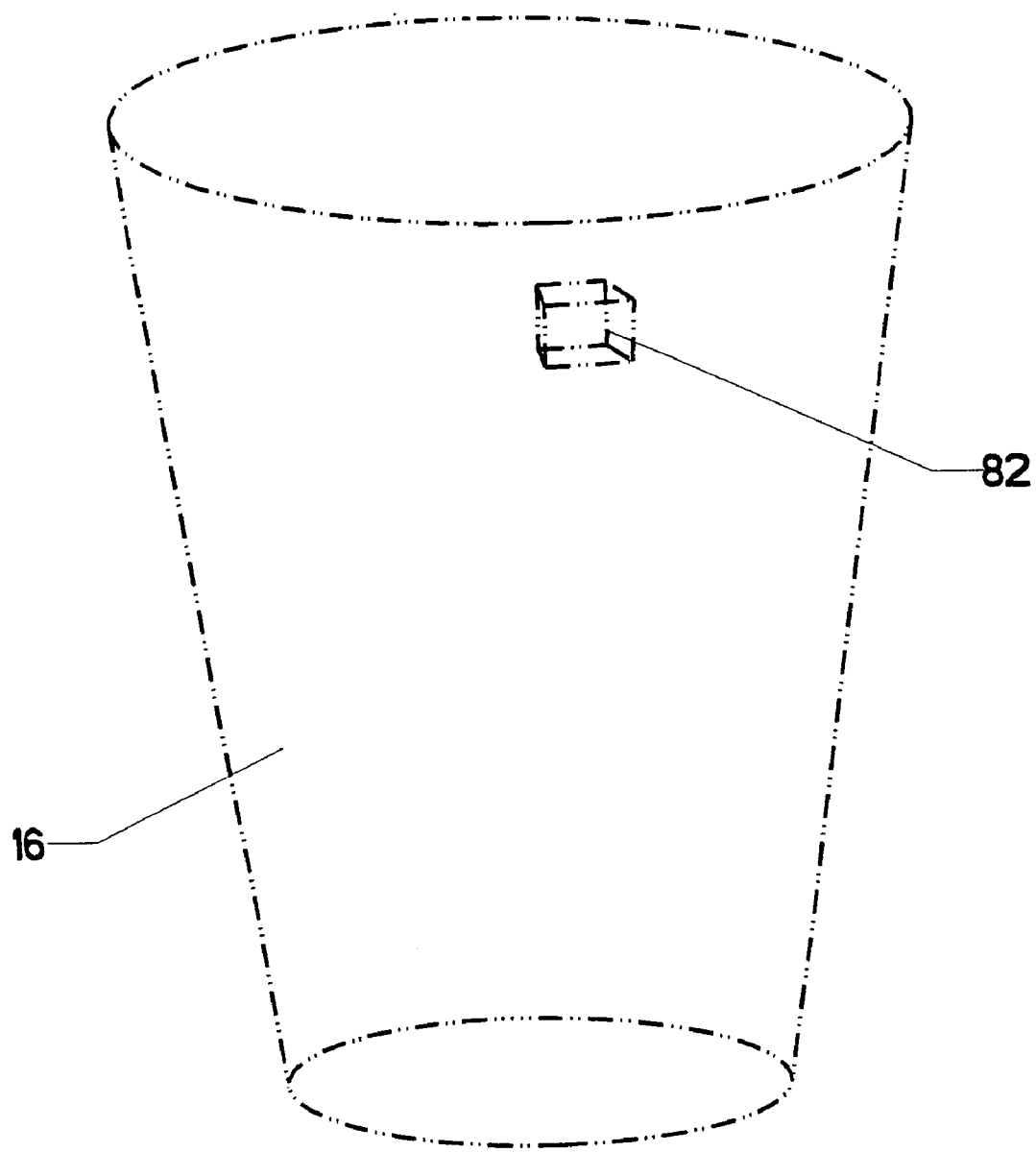
FIG. 19 is a perspective view, showing an analytical element within the potted region.
Figure 20:
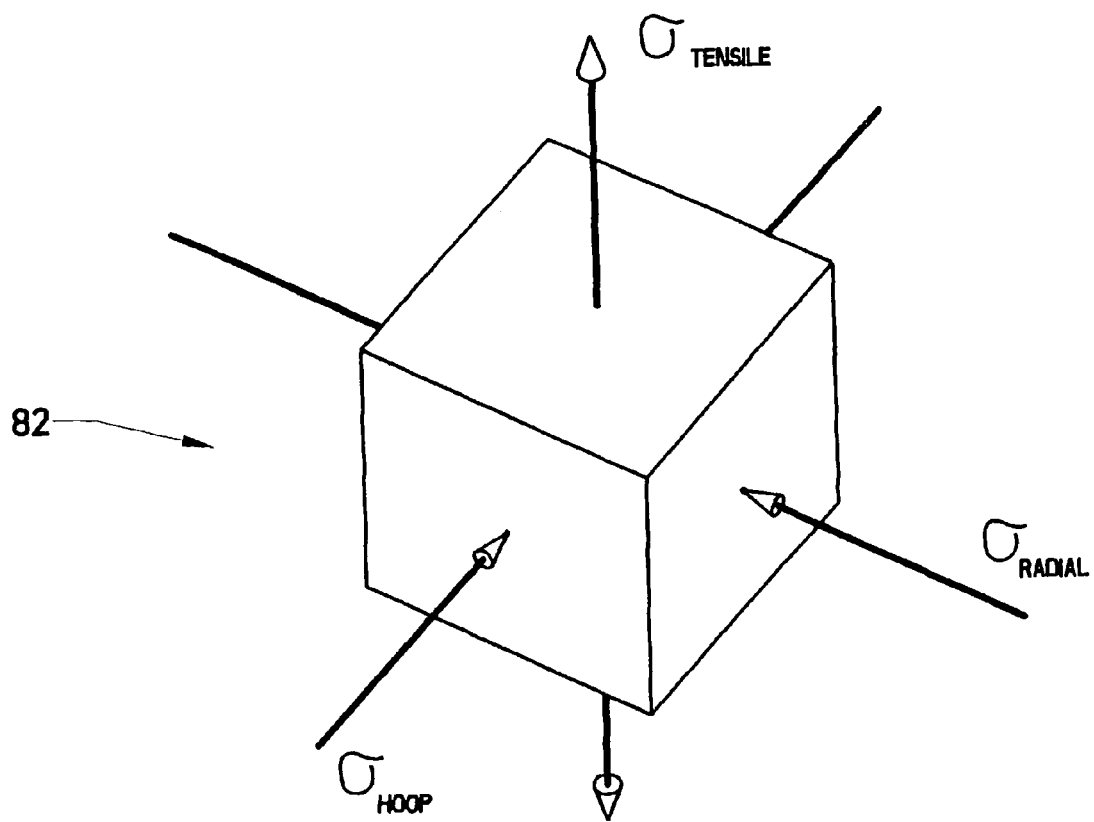
FIG. 20 is a perspective view, showing the analytical element of FIG. 19 in a triaxial stress state.

Stress within the potted region is a complex phenomenon having many components. FIG. 19 shows analysis element 82 lying at a point within potted region 16. Analysis element 82 is a small portion of the potted region defined to facilitate consideration of stress. The creation of such an element will be familiar to those skilled in stress analysis and particularly finite element analysis. FIG. 20 shows the normal stresses placed on analysis element 82. These perpendicular stresses are referred to as hoop stress, radial stress, and tension stress ($\sigma_{hoop}$, $\sigma_{radial}$, $\sigma_{tension}$). Shear stress components are present as well, though in most locations within the potted region these shear stresses are smaller than the perpendicular stresses. Hoop stress is a substantial factor in determining the stress distribution within the potted region. In the case of a conically-shaped potted region (as depicted in FIGS. 1 through 10), the radial stress will be approximately equal to the hoop stress. Of course, the present invention proposes substantially altering the traditional conical shape. However, at the outset of the optimization process, one may safely consider the radial stress to be roughly equal to the hoop stress. Thus, optimizing the wall profile to produce a good hoop stress distribution is an appropriate initial step.

The analysis which was graphically depicted in FIGS. 6 through 9 contains an important implication. In a conical shape (a wall profile which is simply a straight line), hoop stress is greatly concentrated in the neck region. This is true because of the non-linear relationship between the radius of a circle and the area corresponding to that radius. If one doubles the radius of a circle, the area is multiplied fourfold. Conversely, if one halves the radius of a circle, the resulting area will only be one fourth as large. Thus, for a given fixed amount of radial compression, a smaller circle undergoes a greater strain than a larger circle. Since stress is linearly proportional to strain, the smaller circle experiences greater stress. This fact means that the smaller cross sections near the neck region experience greater hoop stress than the larger cross sections near the distal region.

Figure 1:
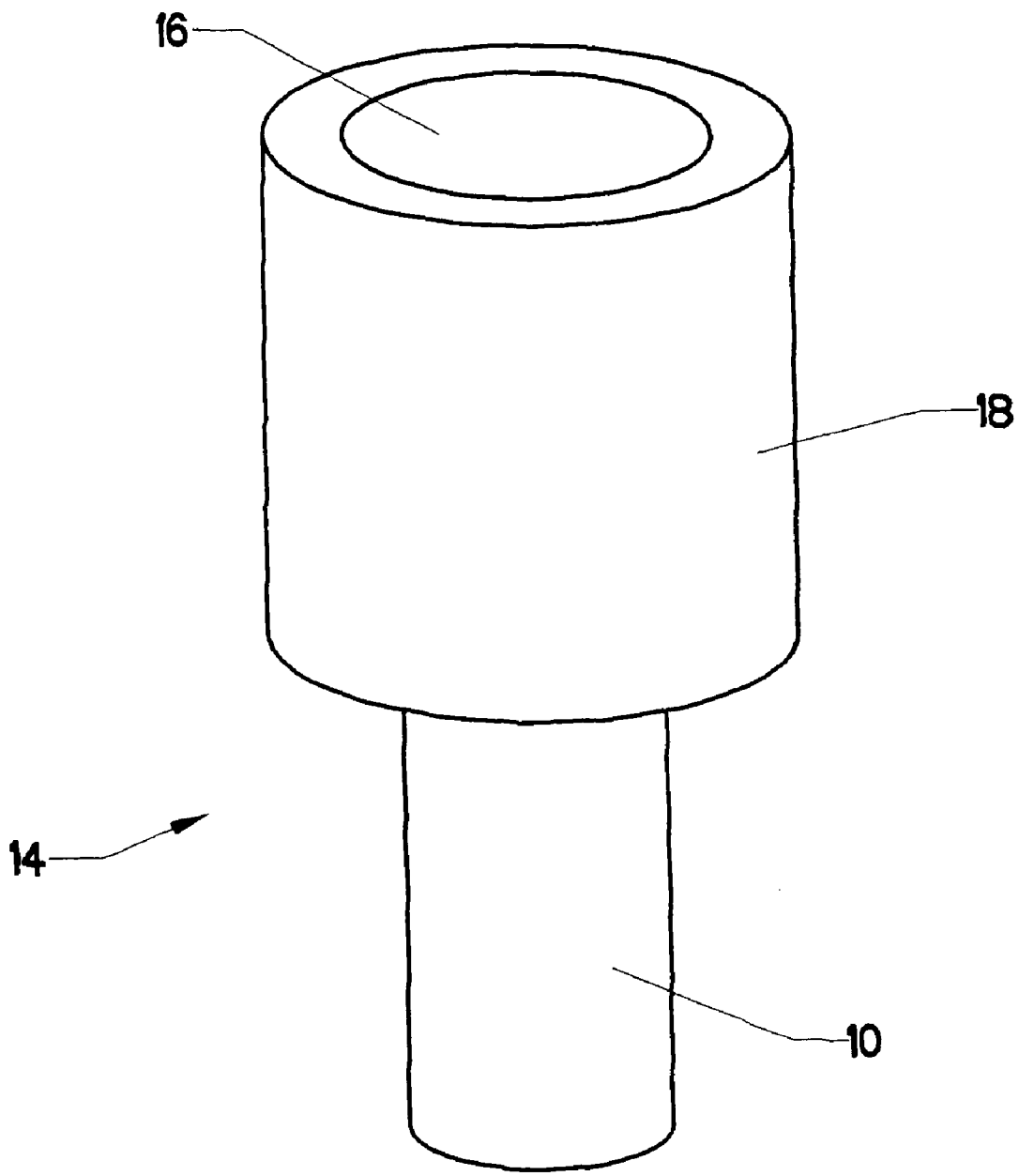
FIG. 1 is a perspective view, showing a prior art termination.
Figure 2:
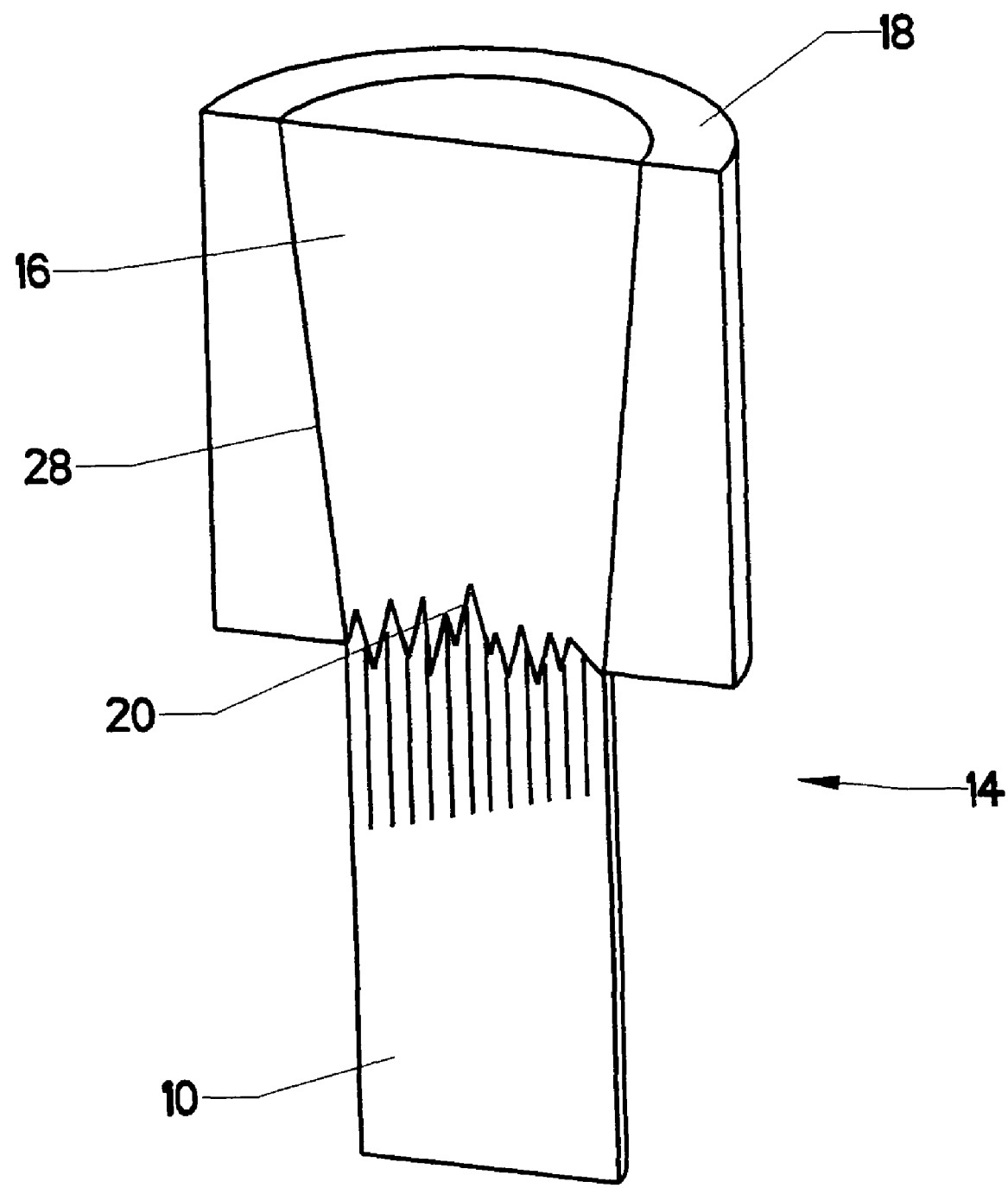
FIG. 2 is a sectioned perspective view, showing internal features of a prior art termination.
Figure 4:
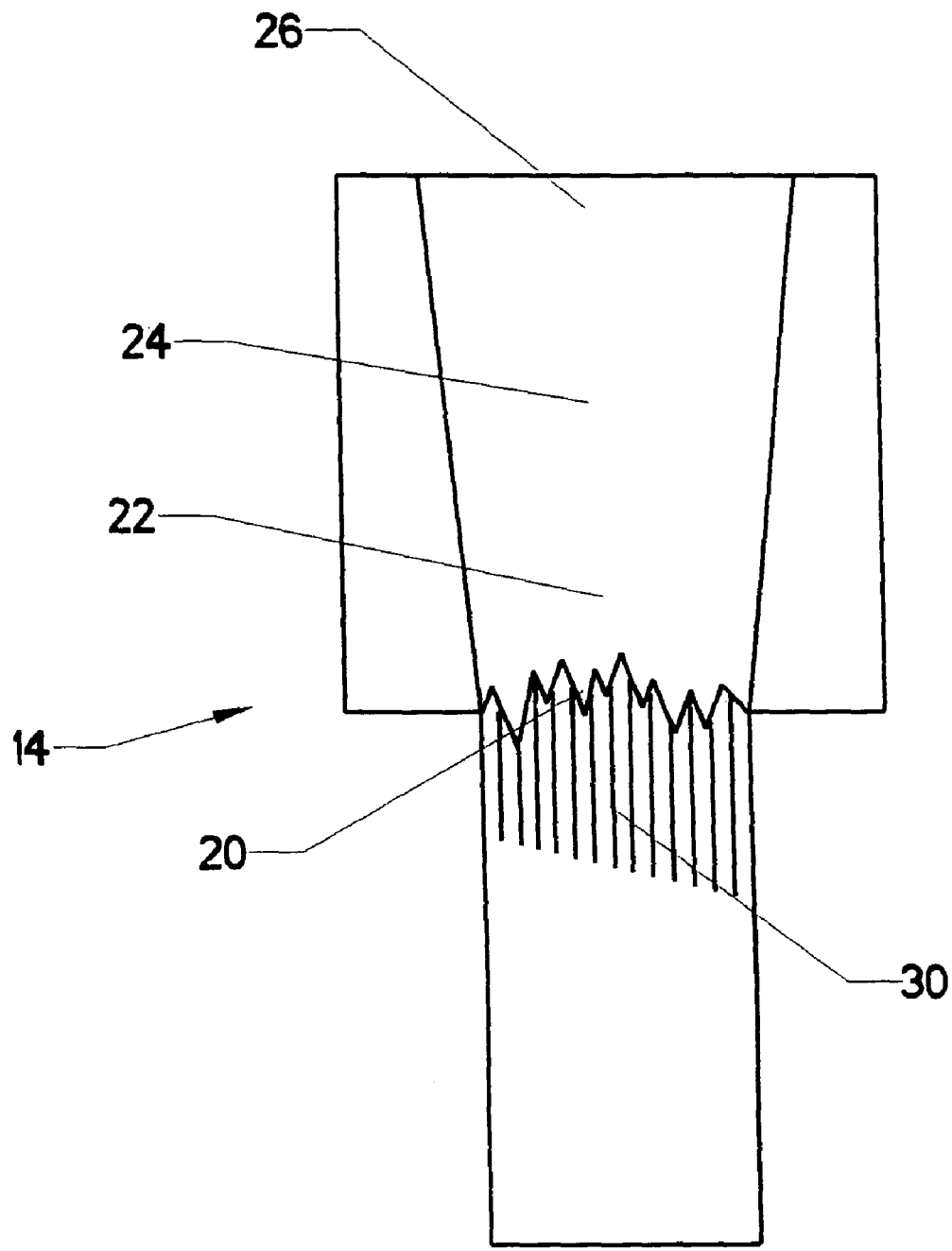
FIG. 4 is a sectioned elevation view, showing internal features of a prior art termination.
Figure 5:
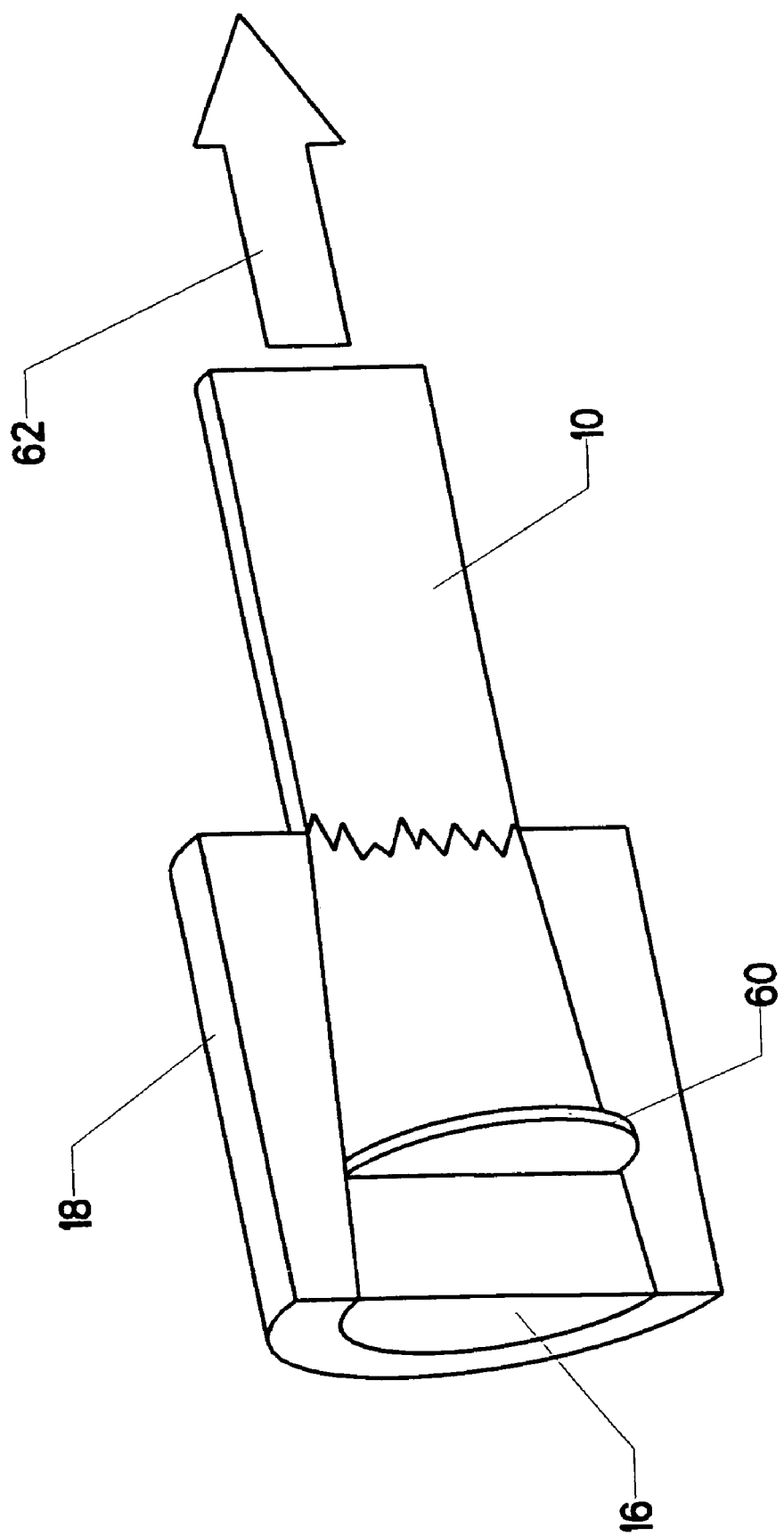
FIG. 5 is a perspective view, showing an analysis of stresses within the potted region.
Figure 6:
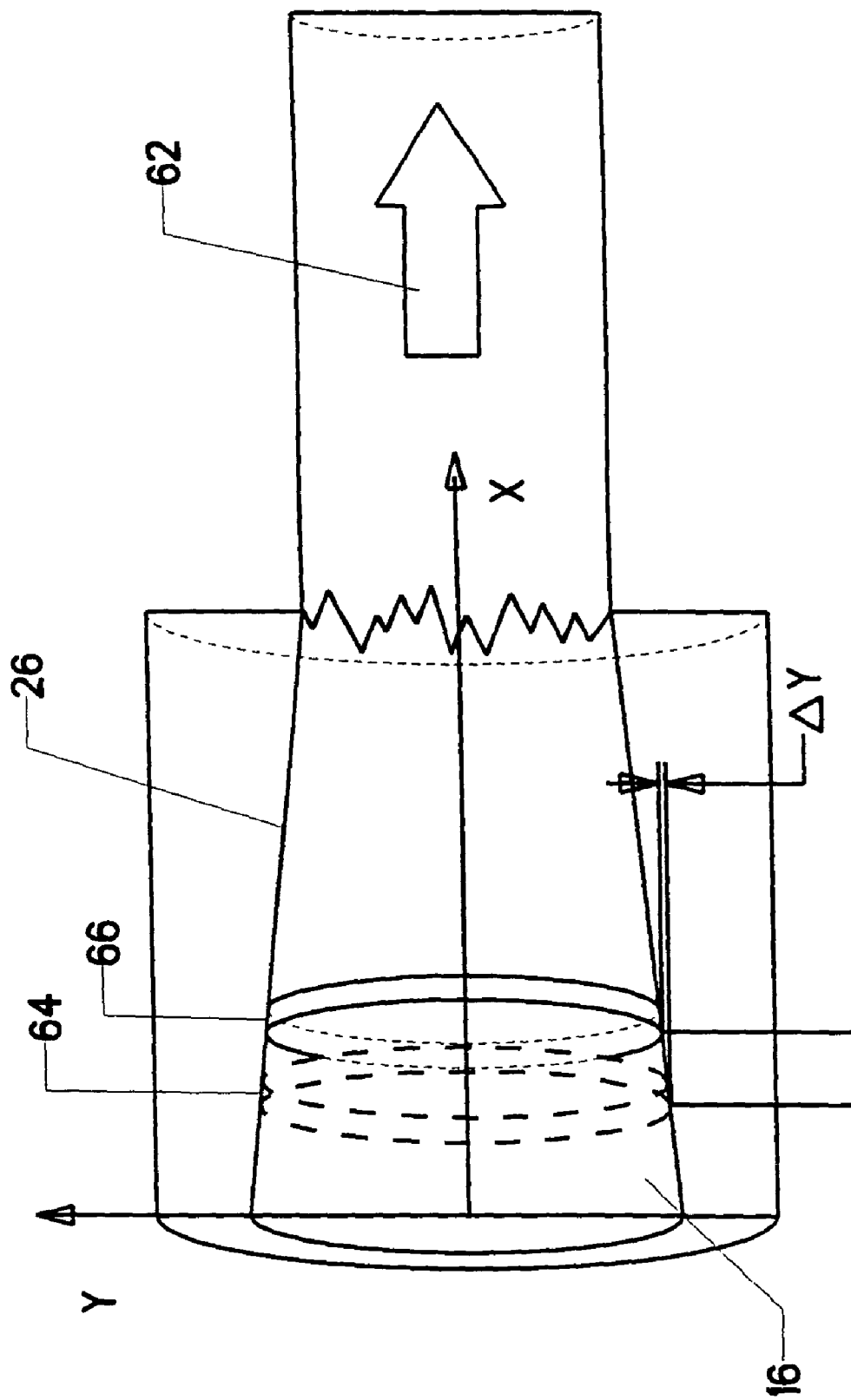
FIG. 6 is a perspective view, showing an analysis of stresses within the potted region.
Figure 7:
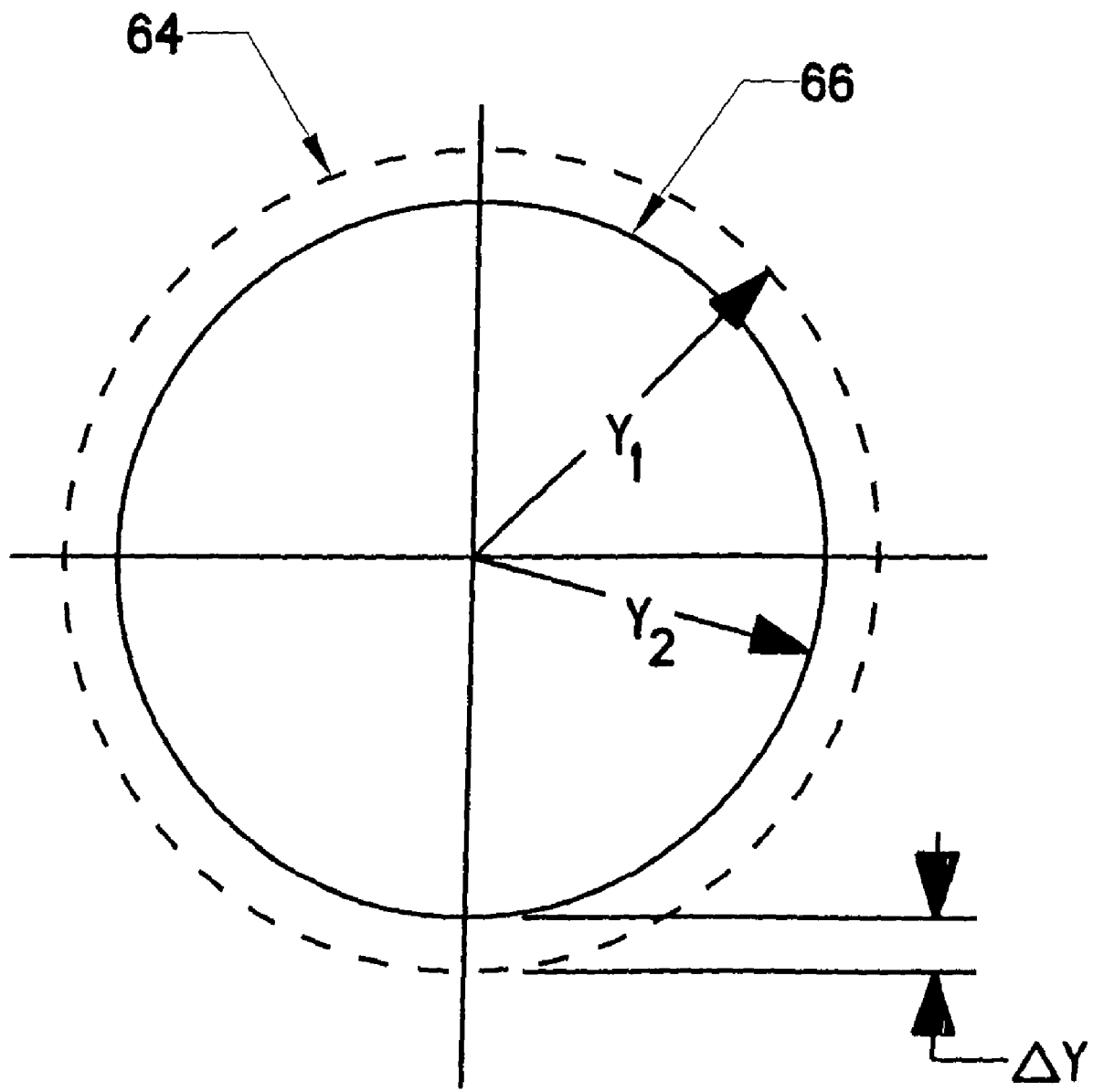
FIG. 7 is an elevation view, showing the compression of a thin cross section
Figure 8:
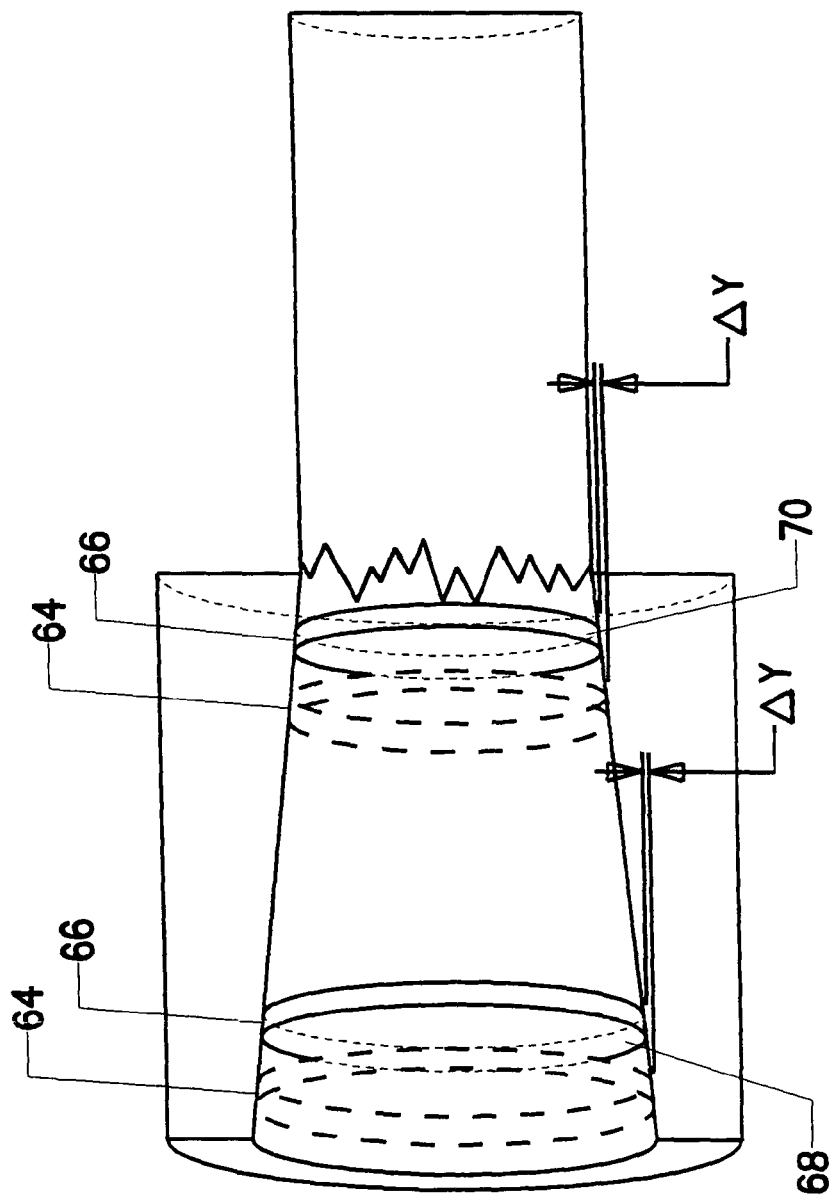
FIG. 8 is a sectioned perspective view, showing an analysis of stresses within the potted region.
Figure 9:
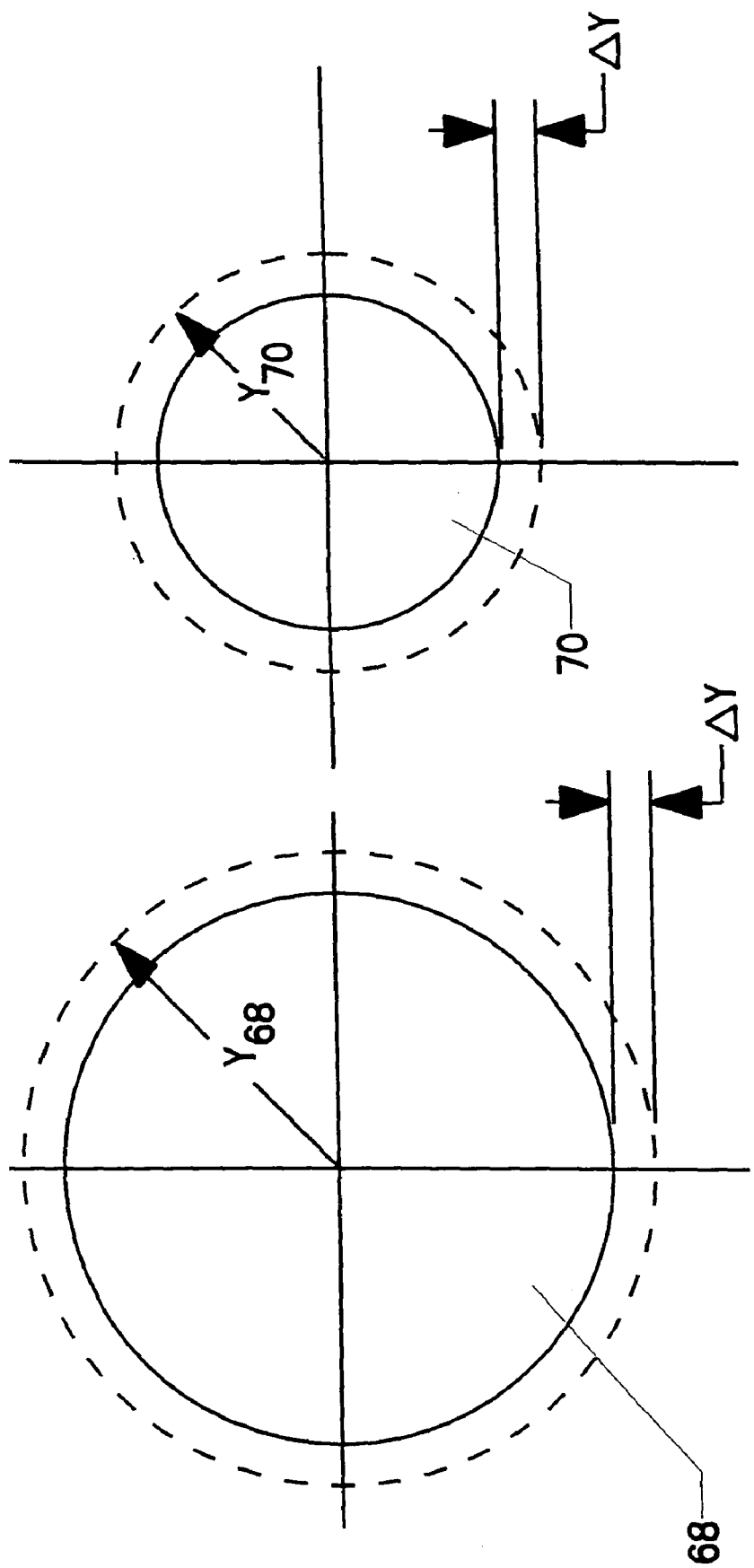
FIG. 9 is an elevation view, showing a comparison of compression within two thin cross sections.
Figure 12:
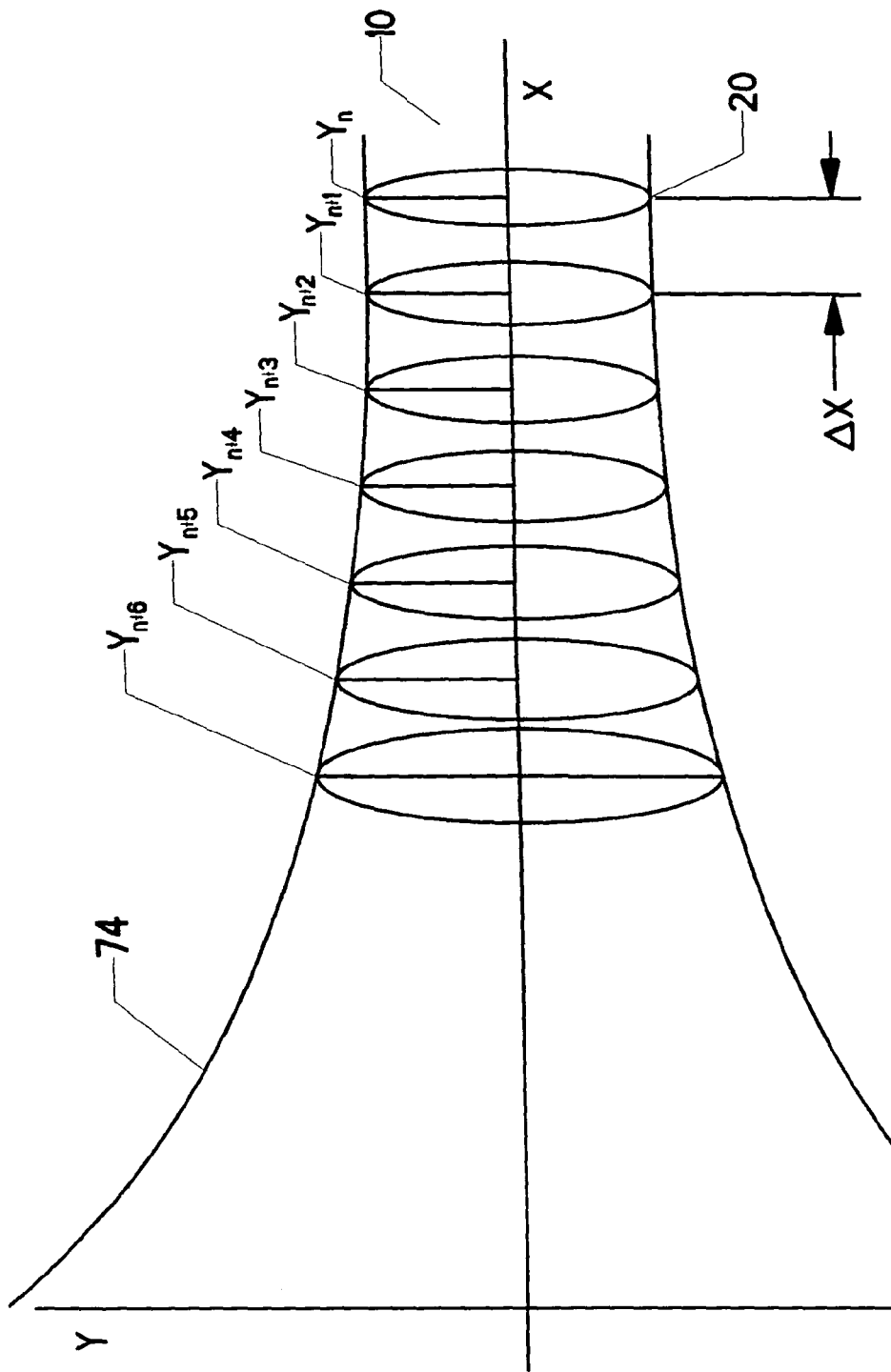
FIG. 12 is a schematic view, showing a progression of circular cross sections used to optimize a wall profile for hoop stress distribution.

However, an altered wall profile can change this condition. FIG. 12 shows a wall profile plotted with the same coordinate system as defined in FIG. 6. A succession of circular cross sections are depicted. The cross section furthest to the right matches the radius of cable 10. It has a radius of $Y_n$. Proceeding to the left, a series of additional cross sections are shown having radii $Y_{n+1}$, $Y_{n+2}$, $Y_{n+3}$ .... The sections are separated along the X Axis by a uniform distance $\Delta X$. The series of cross sections starts on the right side of the view and progresses toward the left. From a standpoint of mathematics, the starting point is of no great significance. However, as a practical matter, the radius at the neck region should approximately match the radius of the cable. Thus, it makes sense to define the first cross section at the point of interface between the potted region and cable 10, then work toward the distal region of the anchor. In the context of the orientation shown in FIG. 12, this means defining the first section on the right hand extreme of the anchor and then moving toward the left to generate additional cross sections.

Figure 13:
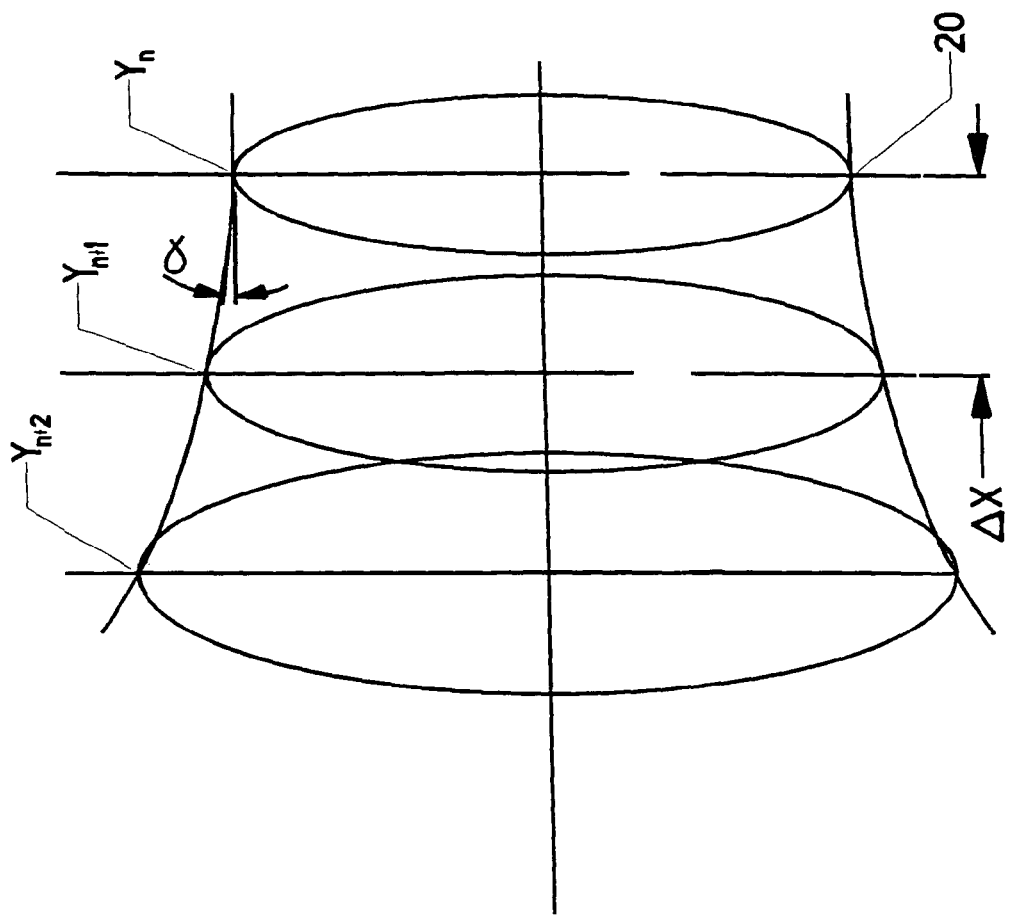
FIG. 13 is a schematic view, showing three successive circular cross sections used to optimize a wall profile for hoop stress distribution.

FIG. 13 shows three cross sections in the neck region in greater detail. The wall profile is defined by a succession of area ratios for the cross sections. This will be explained conceptually using the graphics, after which a mathematical formula defining the profile will be explained. Looking at FIG. 13, the radius at $Y_n$ will be equal to the cable radius (the aforementioned practical constraint). An initial slope of $\alpha$ can be arbitrarily defined for the wall at the point of the first section. An arbitrary step distance $\Delta X$ along the X Axis can likewise be defined. Using the slope and the step distance, the radius $Y_{n+1}$ can be determined. This defines the next circular cross section.

The step distance $\Delta X$ is exaggerated in the view. In actuality it should be much smaller. It is in fact desirable (for analytical purposes) to choose a step distance which is in the range of a typical seating distance. The "seating distance" can be defined as the amount the potted region shifts along the central axis of the anchor's internal passage when the cable is placed under substantial tension. The shift of course results from the potted region being squeezed inward by the wedging effect of the encompassing passage wall.

If $\Delta X$ is set to equal the seating distance, then the reader will recall from the prior explanation that the hoop stress occurring at $Y_n$ can be expressed as:

$$\sigma_{hoop} \approx k_1 \cdot \left(1 - \frac{Y_n^2}{Y_{n+1}^2}\right)$$

This expression holds for the analysis all along the length of the potted region. In the context of the orientation shown in FIGS. 12 and 13 (where the passage expands when proceeding from right to left), $Y_n$ is the radius of an arbitrarily selected cross section and $Y_{n+1}$ is the radius of a cross section which is a distance $\Delta X$ to the left of the selected cross section.

Since the initial goal is to make the hoop stress uniform, one can readily perceive from the preceding equation that one must make the term $$\frac{Y_n^2}{Y_{n+1}^2}$$

uniform from one end of the potted region to the other. Looking at the three sections shown in FIG. 13, this means that the wall profile must be shaped so that $$\frac{Y_{n+1}^2}{Y_{n+2}^2} = \frac{Y_n^2}{Y_{n+1}^2}$$

(an "area ratio function").

It is convenient to express this area ratio in terms of a constant, C, where $$C = \frac{Y_{n+1}^2}{Y_n^2}.$$

This constant C can be referred to as a coefficient of compression. The expression for C can then be used to solve for the radius of each successive cross section using the following algebraic manipulation:

$$Y_{n+1} = \sqrt{C \cdot Y_n^2}$$

The reader will note that the coefficient of compression is related to the initial radius ($Y_n$) and the initial slope, $\alpha$. One can just as easily develop an expression based directly on these two values. However, the use of the coefficient of compression is a simple way to refer to both. A low number for the coefficient of compression means that a relatively small amount of compressive strain is allowed for a given amount of seating movement, whereas a high number means a relatively large amount of compressive strain is allowed for a given amount of seating movement.

Using the equation, a whole series of circular cross sections can be developed. The first six of these are shown in FIG. 12. The progression can be continued to produce many more cross sections. A curve can then be fitted through the tangent point of the circular sections. This curve is denoted as hoop stress optimized curve 74 in FIG. 12.

This curve can be described as an "area-ratio-function." The radii of successive cross sections forming the curve are "adjusted" so that if the potted region is shifted to the right a fixed distance, each cross section will undergo the same percent reduction in its cross-sectional area. Since hoop stress is strongly related to the percent reduction in cross-sectional area, this approach produces a hoop stress optimized curve.

In order to demonstrate the validity of this approach, it may be helpful to consider the stress placed on two sections in the distal region and two sections in the neck region. Consider an anchor sized to fit a cable which is 0.125 inches in diameter. The radially symmetric anchor has a length of 0.500 inches along its centerline. The radius at potting transition 20 is set to 0.125 (the same as the cable radius). The coefficient of compression is set to 1.03. The value for $\Delta X$ is set to 0.005. A series of values for X and Y can the be developed over the length of the anchor (which extends from X=0 to X=0.500), using the area ratio function. A series of values for the hoop stress on the section can also be computed using the preceding equations. Note that the number presented for the hoop stress is presented with the constant divided out. The values for two sections in the neck region and two section in the distal region are presented in the following table:

| X | Y | $\frac{Y_{n+1}^2}{Y_n^2}$ | $\sigma_{hoop}/k_1$ |
|---|---|---|---|
| .005 | .269974 | 1.03 | .029126 |
| .010 | .266014 | 1.03 | .029126 |
| .495 | .063431 | 1.03 | .029126 |
| .500 | .0625 | 1.03 | .029126 |

The reader will note that the value for the hoop stress remains constant. Thus, the use of the constant area ratio to develop a wall profile serves to create uniform hoop stress from the neck region of the potted region to the distal region.

Figure 14:
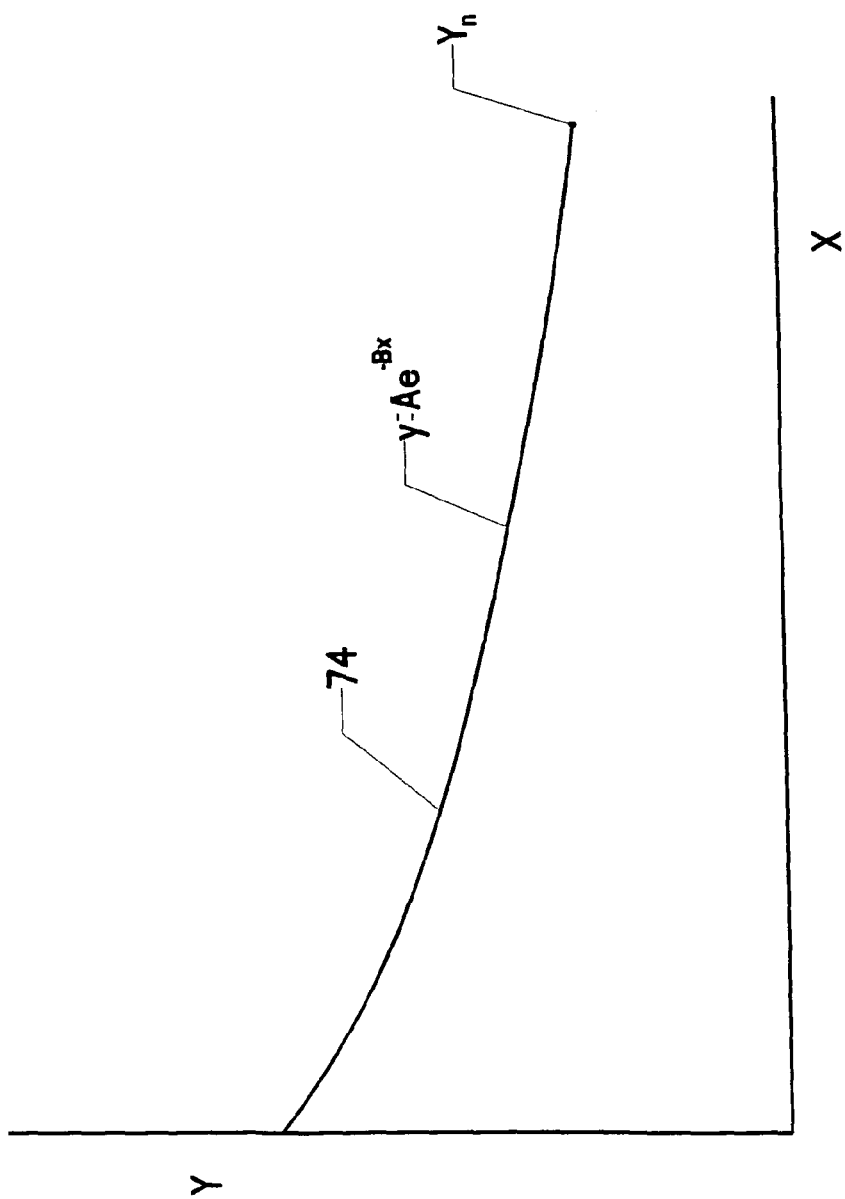
FIG. 14 is a schematic view, showing an optimized wall profile.
Figure 15:
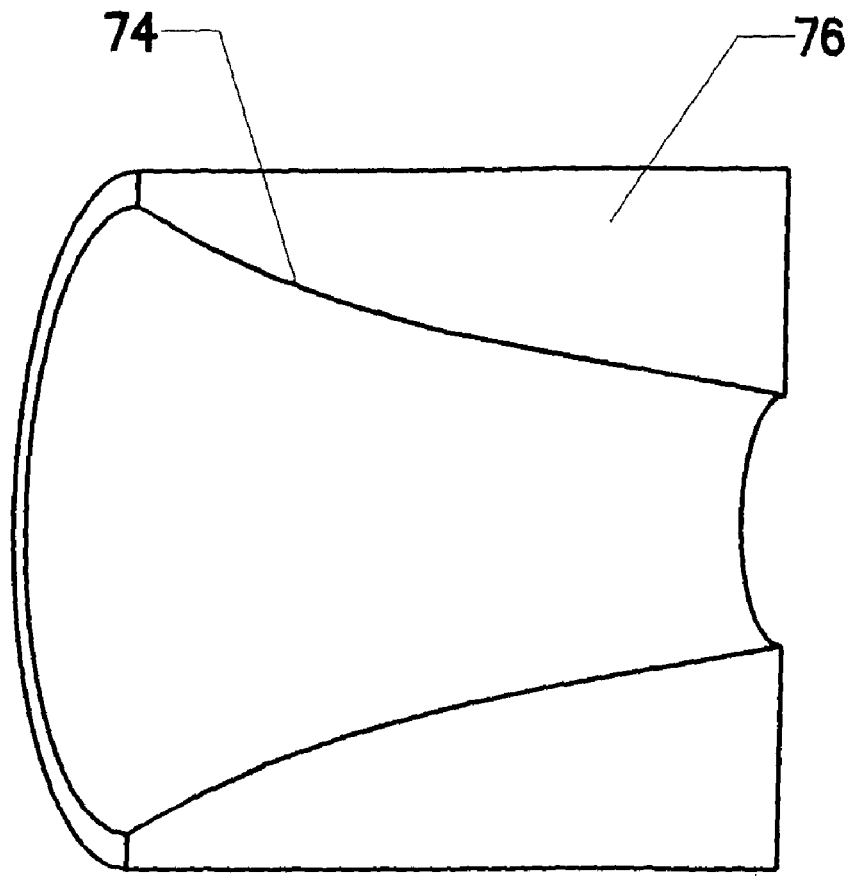
FIG. 15 is a sectioned perspective view, showing an anchor having an optimized wall profile.

FIG. 14 shows a plot of hoop stress optimized curve 74. FIG. 15 shows this curve used as a wall profile revolved around the center line of an anchor. The revolved wall profile defines the shape of the internal passage through the anchor. Thus, the anchor is referred to as hoop stress optimized anchor 76. Those familiar with the mathematics of the area ratio function will realize that the curve shown in FIG. 14 can be expressed as $y=Ae^{-Bx}$, where A and B are constants. This is a function traditionally known as a natural logarithm, with the use of a negative exponent indicating a natural logarithmic "decay" function.

Those familiar with the art will also realize that starting at the point $Y_n$, an infinite variety of hoop stress optimized curves can be created by varying the constants A and B. Using the nomenclature of the coefficient of compression (C), an infinite number of curves can likewise be created by varying that single number. All of these curves may be said to be "hoop stress optimized." However, curves having a high rate of expansion are unsuitable since they will not define a cavity which can fit within a reasonably sized anchor. Likewise, a curve having very little expansion will not secure the potted region within the cavity. It will simply pull through. Thus, the coefficient of compression should be selected to produce a curve of moderate expansion.

Figure 16:
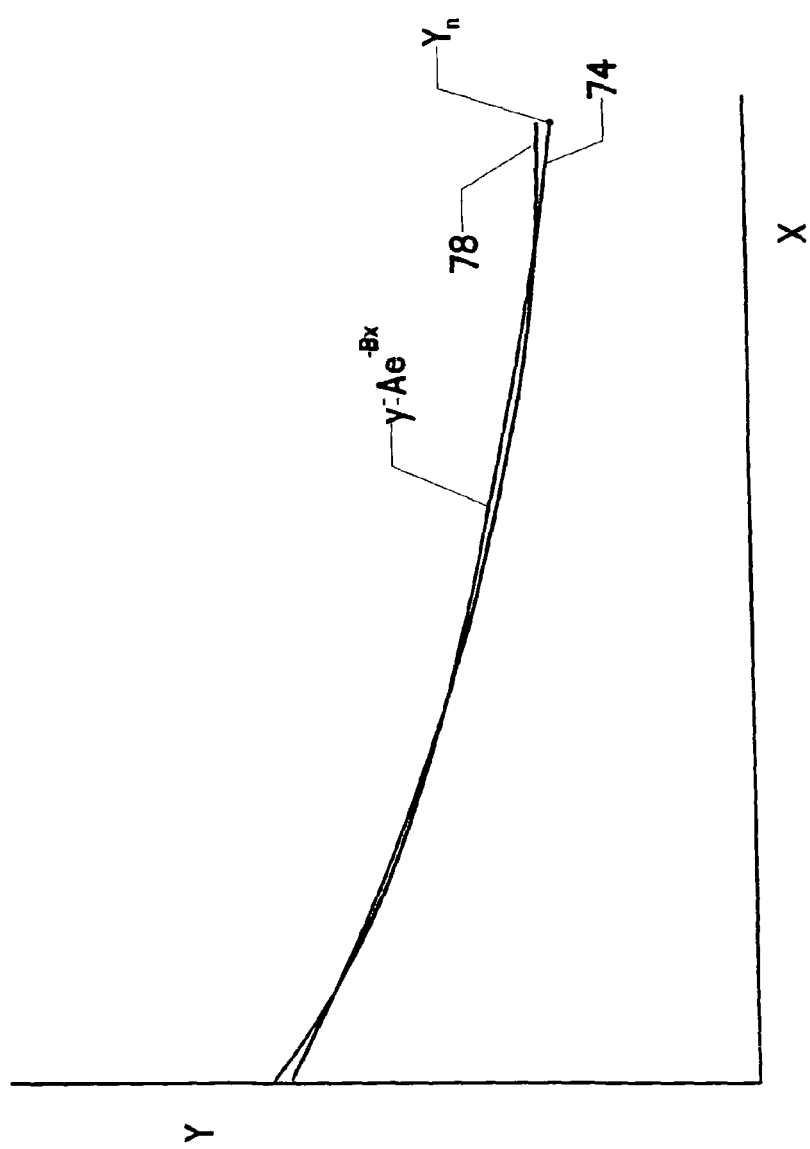
FIG. 16 is a plot view, showing an attempt to approximate the optimized wall profile using a second order curve.

From the definition of the area ratio function (the natural logarithm equation), the reader will understand that the hoop stress optimized curve is not a second order—or parabolic—curve. FIG. 16 illustrates this fact graphically. Hoop stress optimized curve 74 is plotted as for FIG. 14 parabolic approximation 78 is a least-squares fitting of a parabolic curve (second order curve). As the reader can observe, the parabolic curve is a relatively poor fit.

Figure 17:
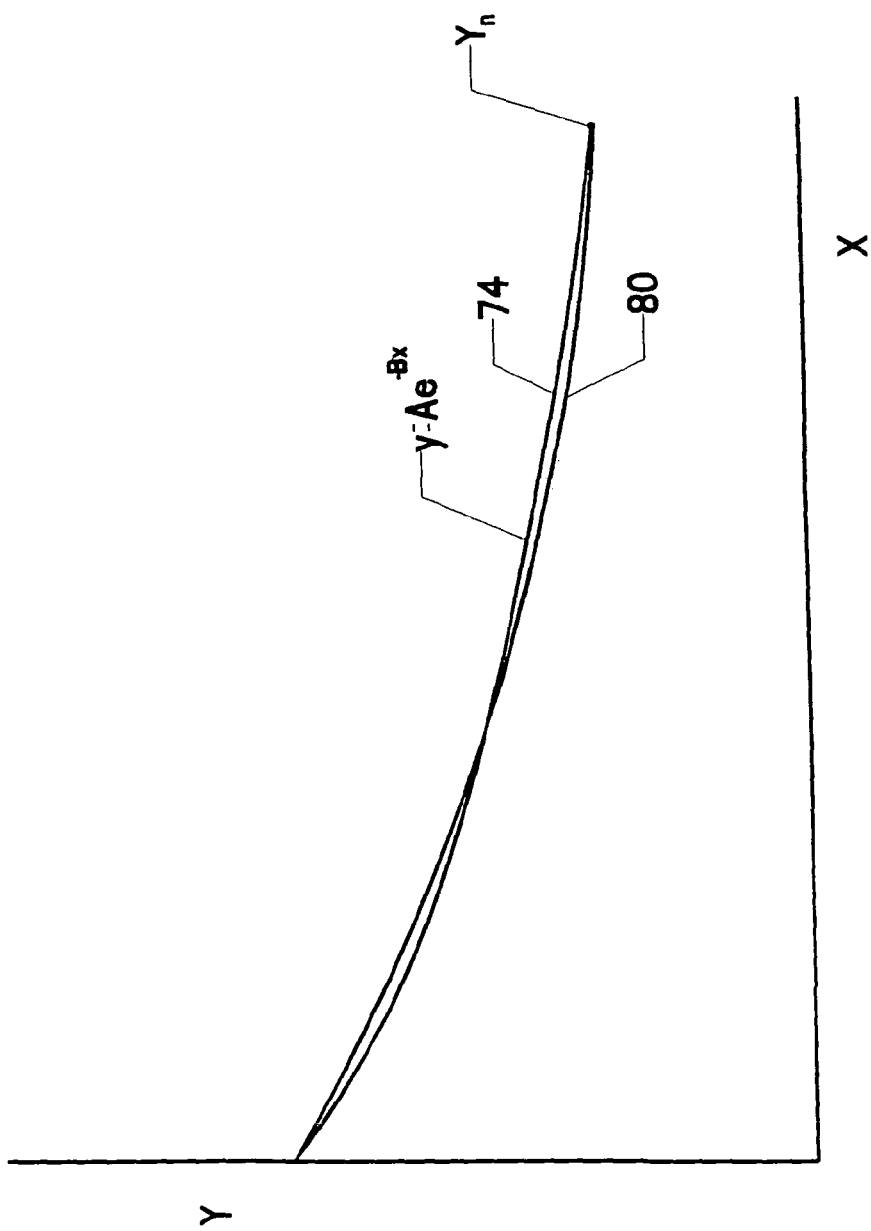
FIG. 17 is a plot view, showing an attempt to approximate the optimized wall profile using a simple arc.

The same can be said for constant radius curves. FIG. 17 represents an attempt to fit constant radius curve 80 (a simple arc) to hoop stress optimized curve 74. Again, the error is significant. Clearly, the hoop stress optimized curve cannot be accurately approximated using a constant radius arc.

Figure 17B:
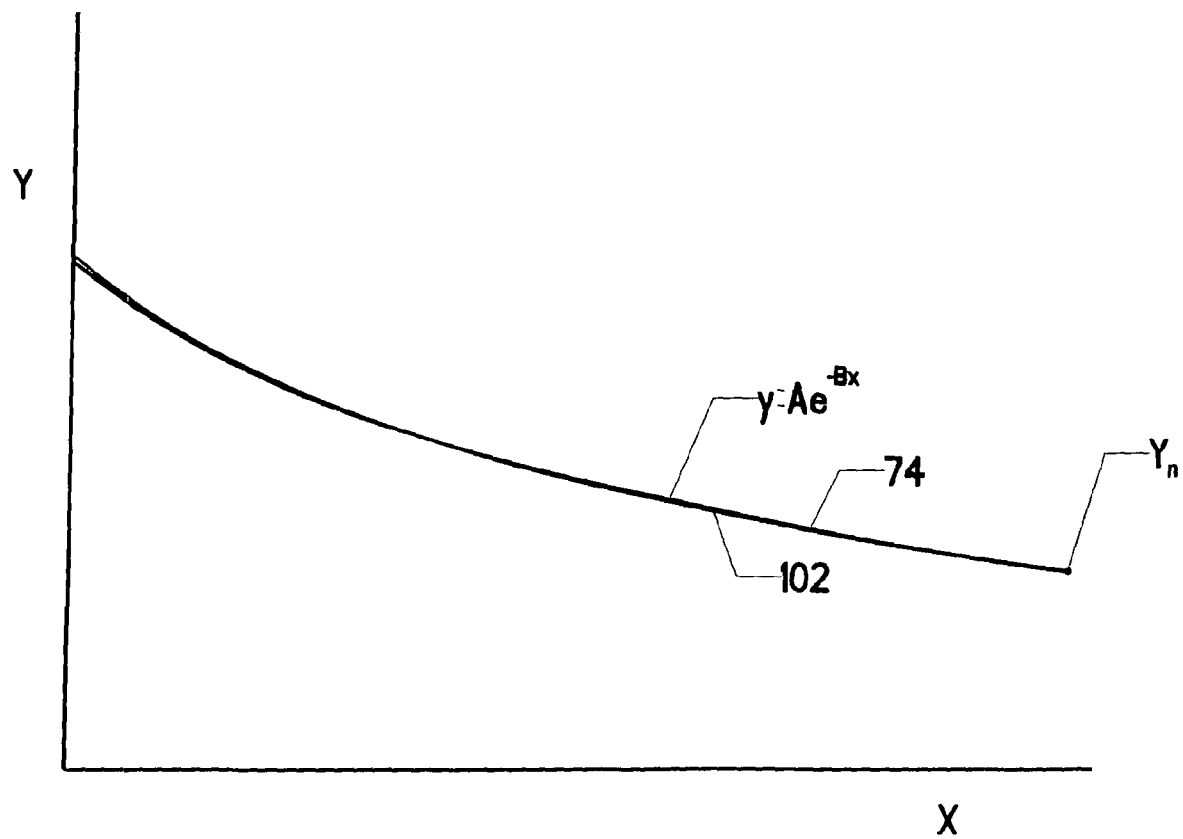
FIG. 17B is a plot view, showing the use of a third order curve to approximate the area ratio function.

On the other hand, a third-order curve can provide a good fit. This expression assumes the form $y=A \cdot x^3+B \cdot x^2+D \cdot x+E$, where A, B, D, and E are constants (C is not used to represent a constant in this expression since C has already been used to denote the coefficient of compression). FIG. 17B graphically depicts a least-squares fit of third order curve 102 over hoop stress optimized curve 74. A good fit is obtained. Thus, a third order curve with appropriate coefficients can produce an excellent hoop stress optimized curve.

Returning to the triaxial stress element depicted in FIG. 20, however, the reader will recall that hoop stress is only one component of the normal stresses placed on analysis element 82. Tensile and radial stresses must be considered as well. For compression of a roughly conical shape, the radial stress at most points will be roughly equal to the hoop stress. Thus, a wall profile which produces a desired distribution for hoop stress works for radial stress as well. Those skilled in the art will know, however, that the tensile stress is not easily related to the hoop stress.

FIG. 18 graphically depicts the distribution of tensile stress within the potted region. A very simple shape is used for the potted region (a pure cylinder). The evenly distributed triangles represent an even distribution of forces holding the potted region in place. If tension is placed on the cable, then the tension throughout the freely flexing portion of the cable will be fairly uniform. The tensile stress distribution within this potted region is plotted in the upper portion of the view. The tensile stress linearly increases from zero at the distal extreme of the potted region to the stress found within the cable at potting transition 20.

The magnitude of this tensile stress is significant with respect to the hoop stress. Varying the wall profile will of course vary the tensile stress curve depicted. However, one can always say that the maximum tensile stress will occur in the neck region. The hoop stress optimized wall profile does nothing to alter this phenomenon. Thus, a wall profile which is optimized only for hoop stress can be further improved.

Returning to the analysis element of FIGS. 19 and 20, the reader will recall that three orthogonal normal stresses are placed on the element. One theory useful for analyzing stress in fairly ductile materials is the von Mises-Hencky theory, also known as the distortion-energy theory. A discussion of this theory is beyond the scope of this disclosure, but those knowledgeable in the field of mechanical engineering will fully understand the term von Mises stress, which is a computed stress value which considers all three orthogonal normal stresses. The expression for the von Mises stress is as follows:

$$\sigma' = \sqrt{\frac{(\sigma_{hoop} - \sigma_{radial})^2 + (\sigma_{radial} - \sigma_{tension})^2 + (\sigma_{tension} - \sigma_{hoop})^2}{2}}$$

Because in the case of the potted region the hoop stress and the radial stress are roughly equal, this expression can be simplified to the following without introducing significant error:

$$\sigma' \approx \sqrt{\frac{(\sigma_{hoop} - \sigma_{tension})^2 + (\sigma_{tension} - \sigma_{hoop})^2}{2}}$$

In the case depicted in FIGS. 19 and 20—and indeed for all similarly shaped potted regions—the sign of the hoop stress will be opposite that of the tensile stress. In other words, the hoop stress will be in compression and the tensile stress will be in tension. This allows the von Mises stress expression to be further simplified to the following:

$$\sigma' = \sqrt{\frac{2 \cdot (|\sigma_{hoop}| + |\sigma_{tension}|)^2}{2}} \approx |\sigma_{hoop}| + |\sigma_{tension}|$$

The reader should bear in mind that this equation is a rough approximation. It will not give exact results. But, since experimentation will be required to select the correct wall profile from the many possible optimized wall profiles, a rough approximation which narrows the selection process substantially is quite useful.

The von Mises stress value represents a good approximation of the total stress existing at any point within the potted region. The expression for roughly approximating the von Mises stress suggests an obvious conclusion: The wall profile which is optimized for hoop stress is not well optimized for von Mises stress because it does not account for tensile stress. A modification to the hoop stress optimized wall profile must be made to account for tensile stress.

Figure 20B:
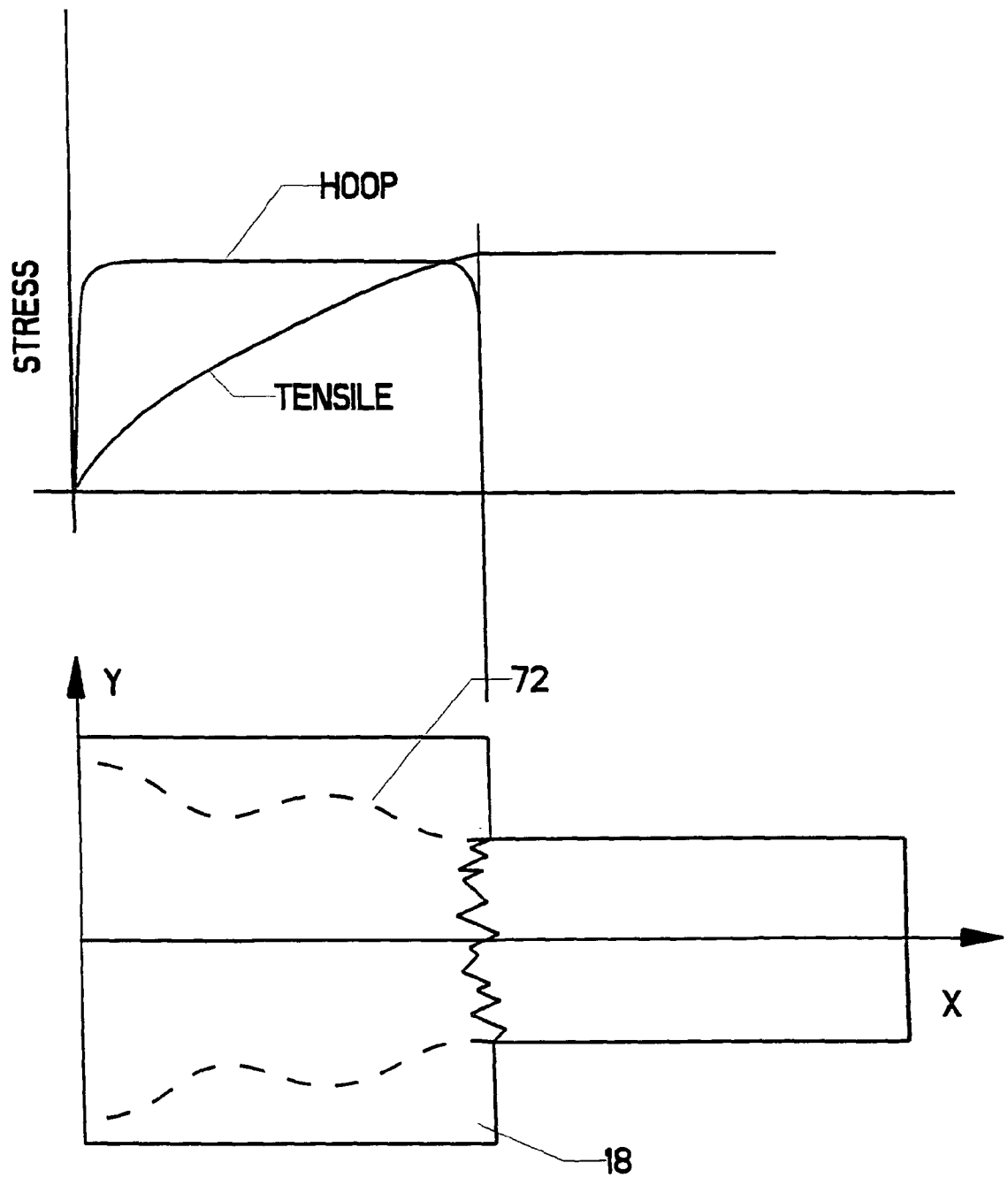
FIG. 20B is a plot view, showing the distribution of hoop stress and tensile stress.

FIG. 20B illustrates this process graphically. The optimized hoop stress curve is shown as approximately flat. This means that the hoop stress is uniform from the distal region through to the neck region. As stated previously, this result is not perfectly achievable in an actual termination. It represents a goal.

The tensile stress is shown on the plot as well. The reader will note that the plotted tensile stress is not linear in this example. The linear plot shown for tensile stress in FIG. 18 is a simplest-case scenario. The actual tensile stress distribution looks more like the one shown in FIG. 20B. The "philosophy" of compensating for tensile stress can now be explained. One can alter the optimized hoop stress distribution so that the sum of the hoop stress and the tensile stress produces a flat curve (as opposed to simply having the hoop stress produce a flat curve). More hoop stress can be allowed in the distal region, since little tensile stress is present in that region. Less hoop stress should be allowed in the neck region since the tensile stress is greatest there. Thus, the goal is to modify the optimized hoop stress curve to produce this result.

Figure 21:
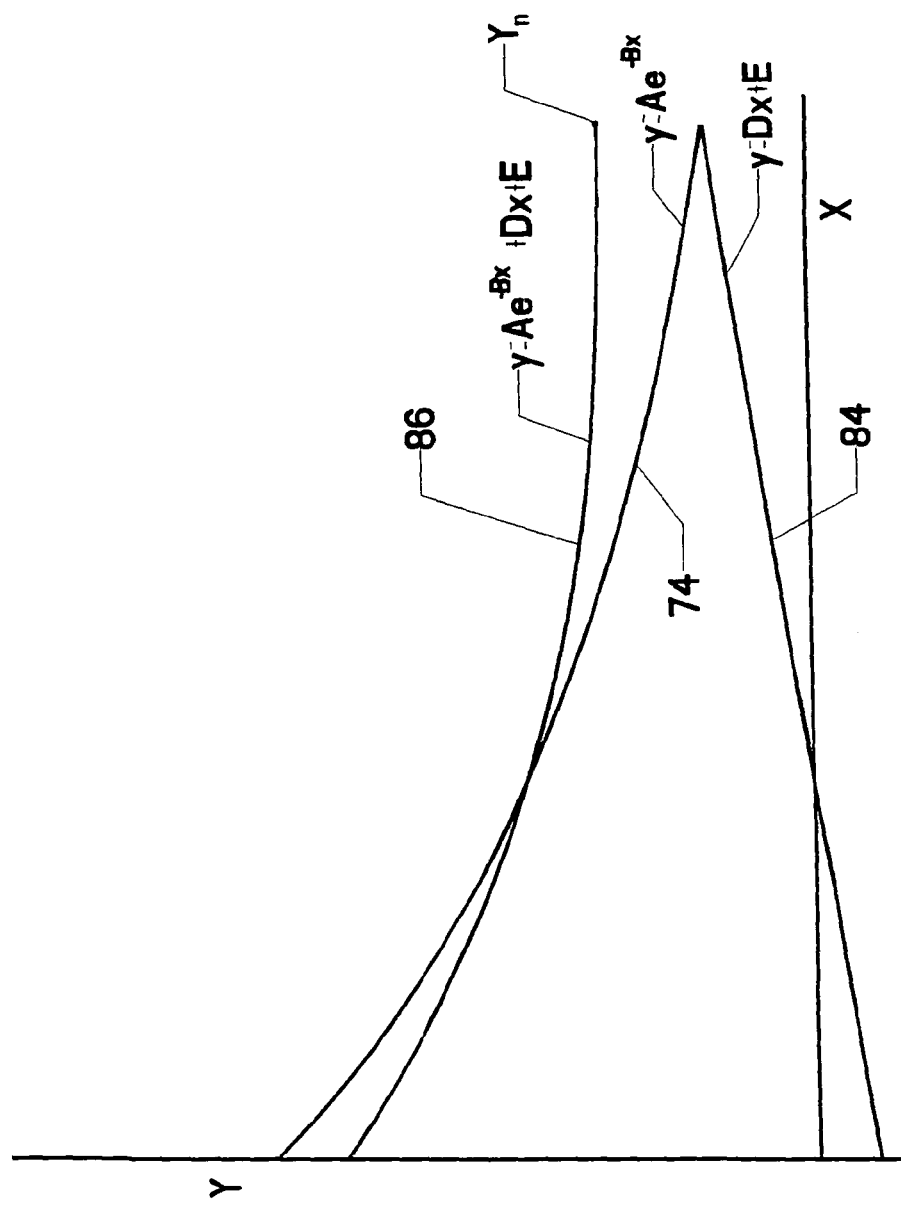
FIG. 21 is a plot view, showing the combination of a hoop stress optimized curve and a tensile stress modifier curve to create a composite curve.

FIG. 21 shows a plot of optimized wall profiles (rather than a stress plot) configured to produce an optimized profile for von Mises stress. Hoop stress optimized curve 74 is created as before. A second curve—denoted as tensile stress modifier curve 84—is added. This second curve is designed to be added to the hoop stress optimized curve to create composite curve 86. In other words, composite curve 86 is simply the sum of the other two curves. Composite curve 86 is revolved around the central axis of the anchor's internal passage (corresponding to the X Axis in the view) in order to create a radially symmetric passage. Many wall profiles are shown in the drawing view to follow. The reader will understand that all these profiles will be revolved to create an anchor passage.

The reader will note that this very simple version of the tensile stress modifier curve achieves the objectives stated for the von Mises stress optimization; i.e., it adds slope to the composite curve in the distal region where extra hoop stress can be tolerated and subtracts slope in the neck region where hoop stress must be reduced.

The hoop stress optimized curve takes the form $y=f_1(x)$, where $f_1(x)$ is based on the area ratio functions described in detail previously. The tensile stress modifier curve takes the form $y=f_2(x)$. This second expression can be a linear function, a second order function, or a higher order function. Thus, the composite curve can be generally expressed as:

$$y=(\text{area-ratio-function})+f_2(x)$$

If the modifier curve is a simple linear function, then the composite curve can be expresses as:

$$y=A \cdot e^{-Bx}+D \cdot x+E$$

Various mathematical functions can be used to approximate this function. These will be described in detail. First, however, it is useful to consider certain practical limitations which restrict the selection of the functions.

In FIG. 21, the point $Y_n$ represents the radius at the anchor's neck (the point where the freely flexing cable exits the anchor). The radius at this point should be equal to or slightly larger than the radius of the cable. Thus, the hoop stress optimized curve and the tensile stress modifier curve should be selected so that their sum will produce a radius of $Y_n$ at the point $X_n$.

The slope at the point $(X_n, Y_n)$ is also important. The wall profile should be tangent or very nearly tangent to the cable at this point. Thus, in the context of the orientation shown in the view, the first derivative of composite curve 86 should be nearly zero at the point $(X_n, Y_n)$.

Figure 22:
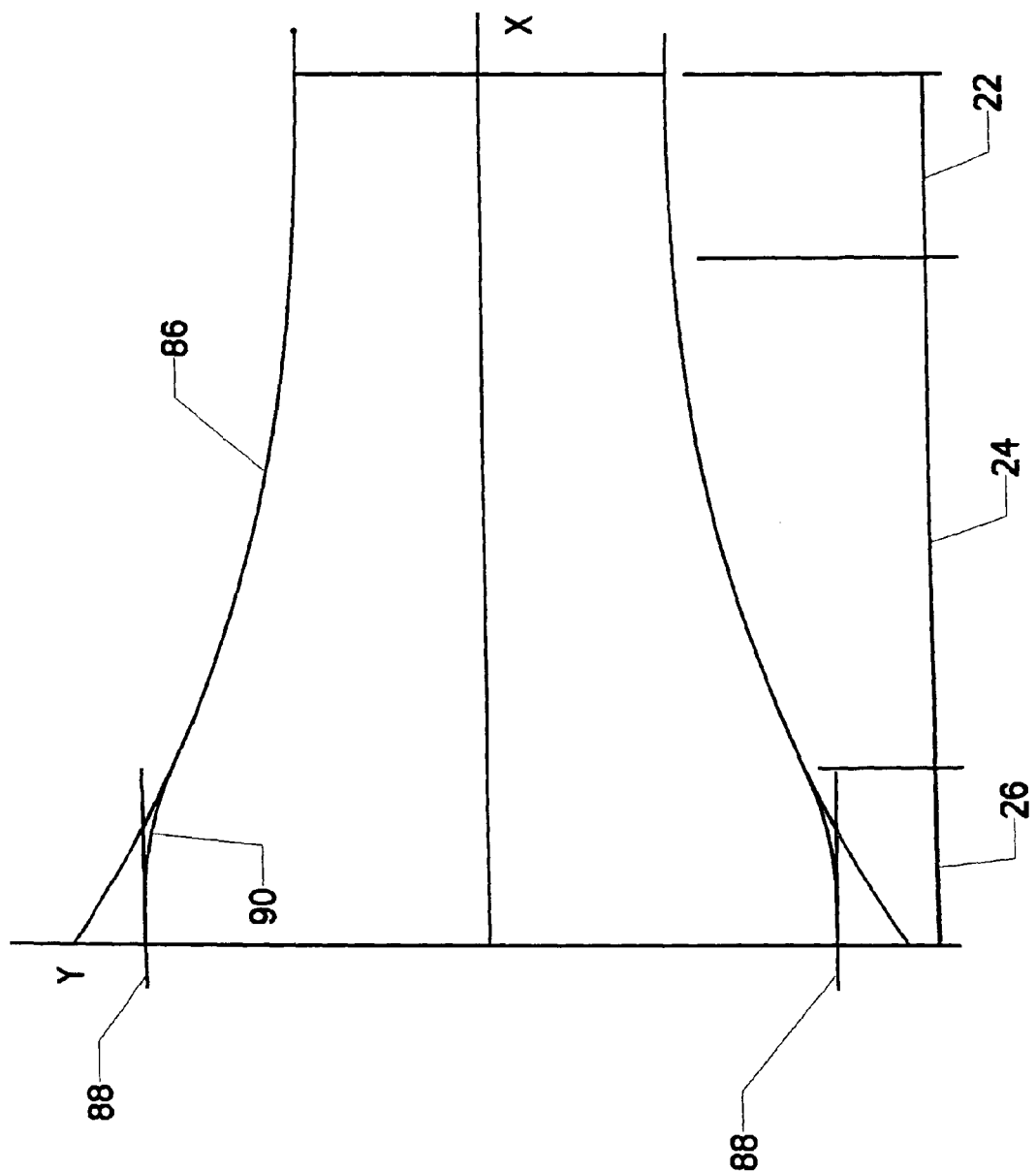
FIG. 22 is a plot view, showing the addition of manufacturing boundaries to the composite curve.

Another practical limitation is that the wall profile must physically fit within the body of the anchor. FIG. 22 shows a plot of composite curve 86 spanning neck region 22, mid region 24, and distal region 26. The curve must generally be optimized for the total stress existing in the neck and mid regions. The stress within the distal region is typically not so important, since the low tensile stress in this region means that the total stress will be relatively low. By the same token, if the composite curve is carried through this region without modification it will produce fairly large diameters (depending on the particular composite curve selected). This fact will require the use of a large diameter anchor body.

Thus, at some point it may be desirable to discontinue the composite curve and carry a less rapidly expanding shape out to the distal end of the anchor. FIG. 22 shows the use of a simple cylindrical wall for this purpose. Diameter boundary 88 intersects the composite curve for this purpose. A fillet 90 can be added between composite curve 86 and diameter boundary 88 in order to smooth this transition.

Figure 23:
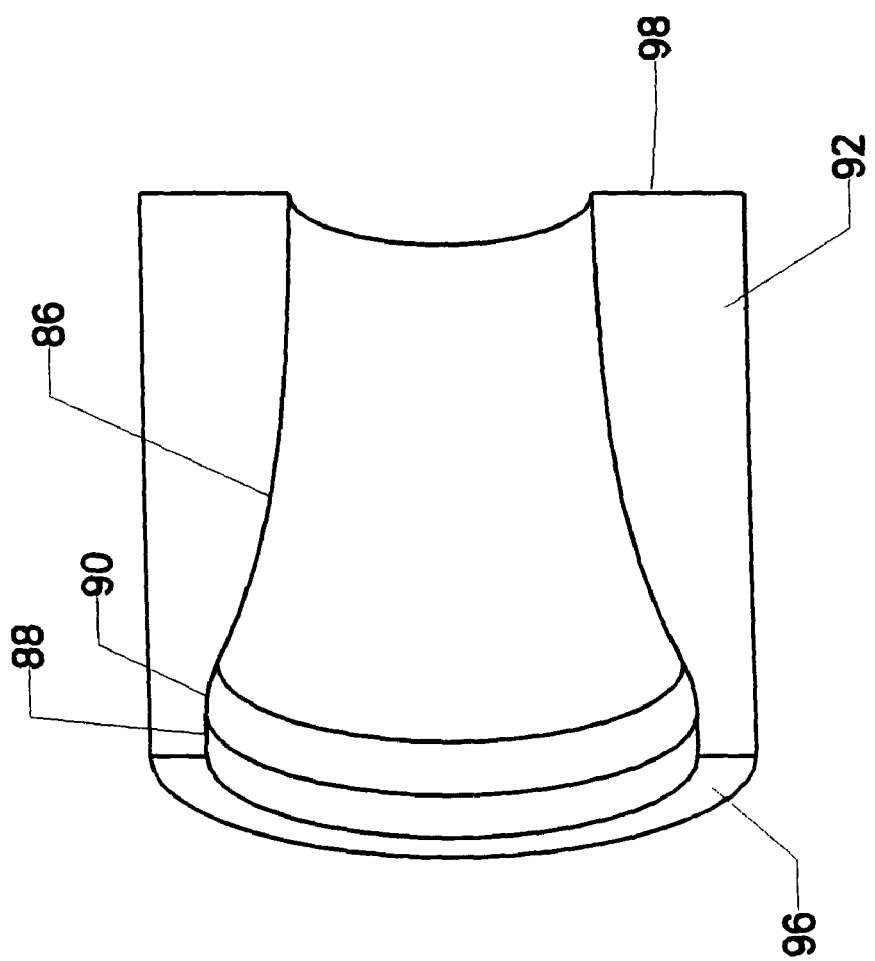
FIG. 23 is a sectioned perspective view, showing an anchor having a wall profile defined by the composite curve.

FIG. 23 is a section view through an anchor made using this approach. The reader will observe that the wall profile of the internal passage is formed by composite curve 86, diameter boundary 88, and a fillet between the two. The anchor is optimized for an even distribution of von Mises stress.

Figure 24:
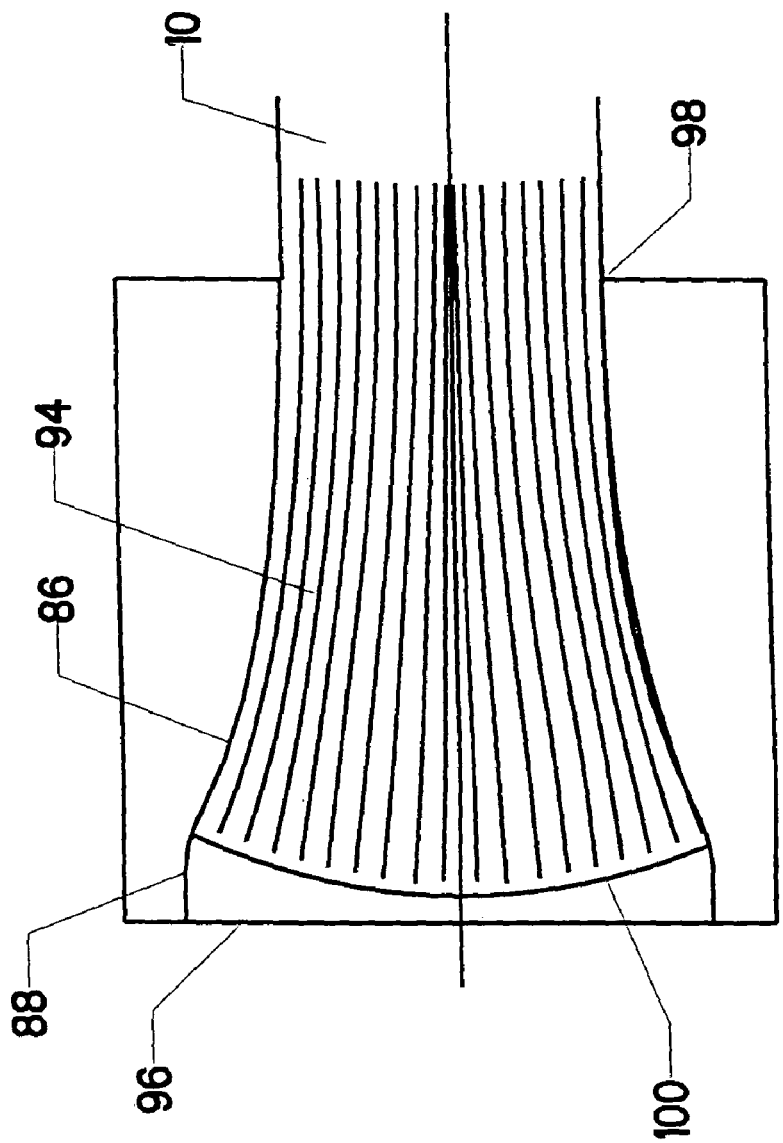
FIG. 24 is a sectioned elevation view, showing how the cable's strands lie within the expanding passage.

FIG. 24 is a sectioned elevation view of the same anchor with cable strands placed within the internal passage. The strands on one end of cable 10 are splayed (displaced radially outward) to form splayed strands 94. The splayed strands form dome shape 100 on their distal end. Once the liquid potting compound hardens to form the potted region, the area within the anchor's internal passage to the right of dome shape 100 will be a composite structure including solidified potting compound and cable strands. The area to the left of dome shape 100 will be solidified potting compound with no strand reinforcement. This unreinforced area is relatively weak. Thus, the region to the left of dome shape 100 in the view cannot significantly contribute to force transmission between the cable and the anchor. It therefore makes sense to discontinue the composite curve around this point and carry diameter boundary 88 out to distal anchor boundary 96.

The length of diameter boundary 88 will vary. In some embodiments dome shape 100 will actually lie on distal anchor boundary 96. For those embodiments, the unreinforced region will be small. However, a diameter boundary may nevertheless be useful, since the elimination of the rapidly expanding region of the composite curve allows the use of a smaller overall diameter for the anchor. In some instances it may be desirable not to carry the composite curve all the way to neck anchor boundary 98 as well. If the composite curve is stopped short of the neck anchor boundary, then a cylindrical cotangent section can be used to bridge the composite curve to the neck anchor boundary.

The reader should bear in mind that the mathematics used to create the optimization are not highly accurate. The potted region is an anisotropic composite, meaning that its mechanical properties differ according to orientation of the analytical plane (much like the grain in a piece of wood). This is obviously true since the reinforcing cable strands run primarily in one direction. Thus, the techniques disclosed provide helpful guidance as to the type of profile needed. The actual coefficients used in the profile must often be determined experimentally.

EXAMPLES OF OPTIMIZED COMPOSITE CURVES

Figure 25:
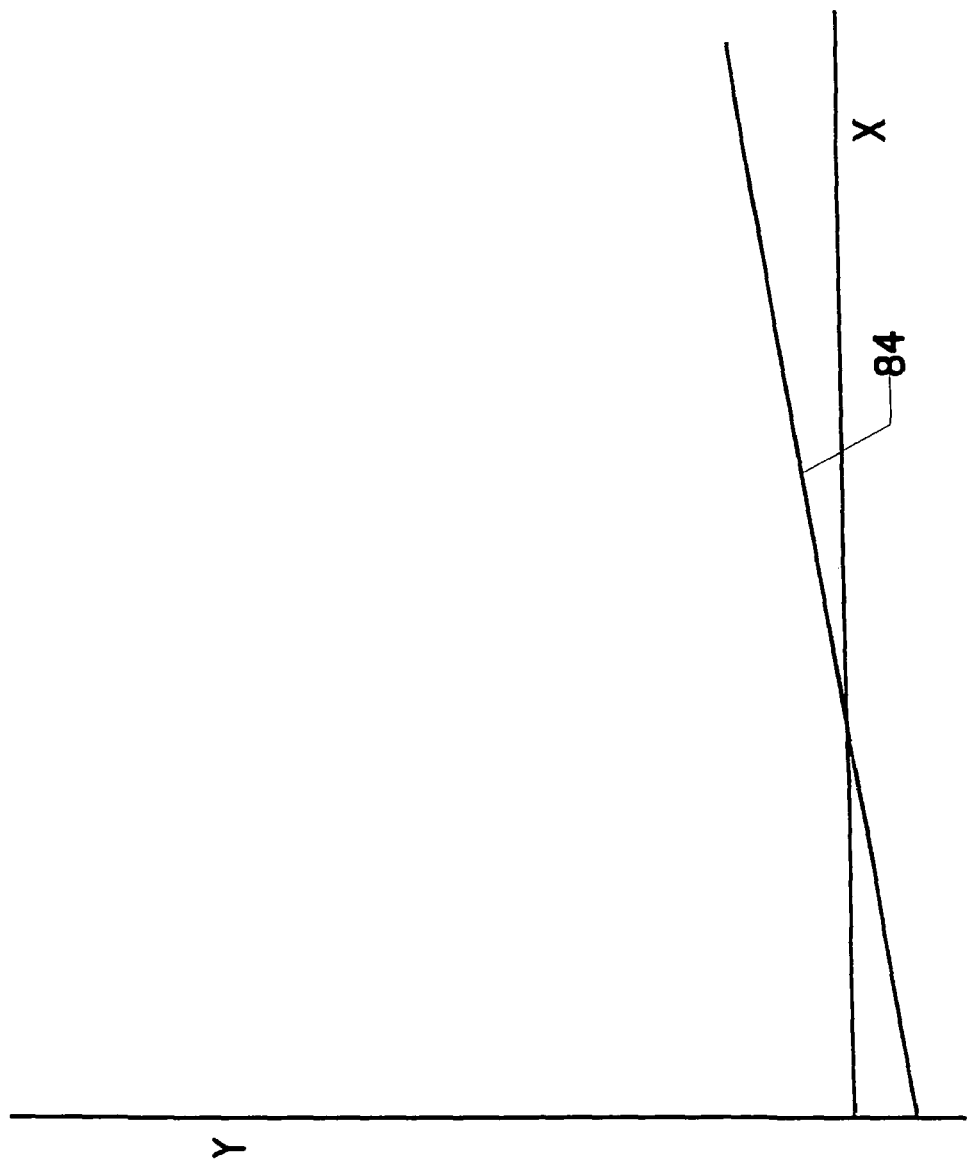
FIG. 25 is a plot view, showing a linear tensile stress modifier curve.

As stated previously, the general expression for the composite curve is the sum of an area ration function plus $f_2(x)$. The area ratio function can be expressed as a natural logarithm. The function $f_2(x)$ can assume many forms. FIG. 25 shows a linear version of tensile stress modifier curve 84, assuming the form:

$$y = D \cdot x + E$$

Figure 26:
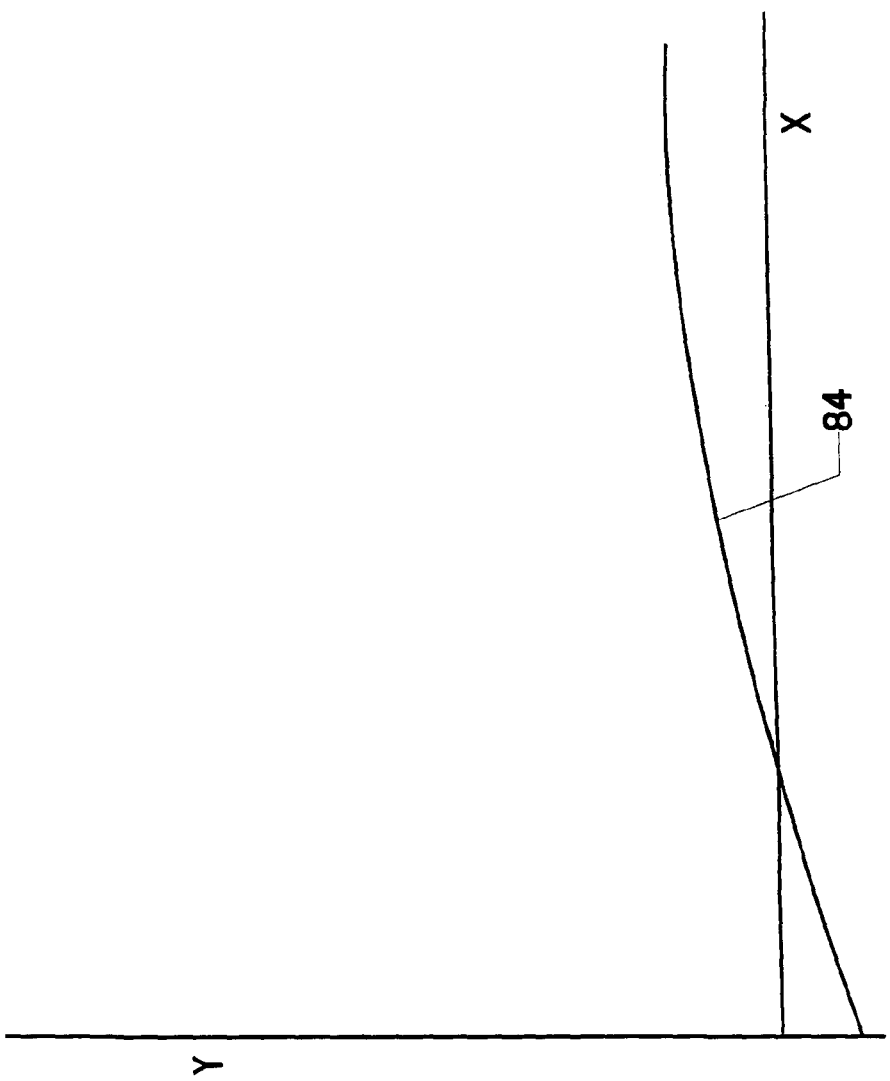
FIG. 26 is a plot view, showing a non-linear tensile stress modifier curve.

FIG. 26 shows the use of an arcuate segment to more closely approximate the actual distribution of tensile stress within the potted region. The curve assumes the form: $(x-x_0)^2 + (y-y_0)^2 = r^2$, where the two constants are offsets for the center of the arc and r is the radius of the arc. This expression can be algebraically rewritten as:

$$y = y_0 + \sqrt{r^2 - (x-x_0)^2}$$

Of course, second and higher order polynominals can be used to create suitable tensile stress modifier curves as well. The simpler versions would assume the form:

$$x = A \cdot y^2 + B \cdot y + D, \text{ or } x = A \cdot y^3 + B \cdot y^2 + D \cdot y + E$$

If these equations are to be expressed in terms of $y=f(x)$, then they would be expressed in terms of logarithms and natural logarithms. All these functions are known to those skilled in the art of mathematics. More detailed explanations of other possibilities will therefore be omitted.

Since the composite curve is the sum of the area ratio curve plus the tensile stress modifier curve, examples of the function for the composite curve are as follows:

$$y = (A \cdot e^{31 Bx}) + (D \cdot x + E)$$

$$y = (A \cdot x^3 + B \cdot x^2 + D \cdot x + E) + (F \cdot x + G)$$

$$y = (A \cdot e^{-Bx}) + (y_0 + \sqrt{r^2 - (x-x_0)^2})$$

$$y = (A \cdot x^3 + B \cdot x^2 + D \cdot x + E) + (F \cdot x^2 + G \cdot x + H)$$

Many combinations of these area curve and tensile stress modifier curves are possible. Many other functions could be substituted for the tensile stress modifier curves. Thus, these equations should be viewed as examples only.

In addition, although a modifier curve intended to account for tensile stress has been explained in detail, the definition of a modifier curve should not be constrained to considerations of tensile stress alone. A different modifier curve could be used to optimize for shear stress. Yet another modifier curve could be used to optimize for some combination of tensile stress and shear stress. Thus, the term "modifier" curve should be understood to potentially include many different considerations intended to reduce the overall stress.

Manufacturability of the optimized shapes is obviously a consideration. The internal passage of an anchor is typically turned on a CNC lathe or similar tool. Third order curves and profiles of similar complexity are not always available on such tools. Thus, it makes sense to consider whether simpler geometry can be used to approximate the optimized composite curve. In fact, simpler geometries can be used.

Figure 27:
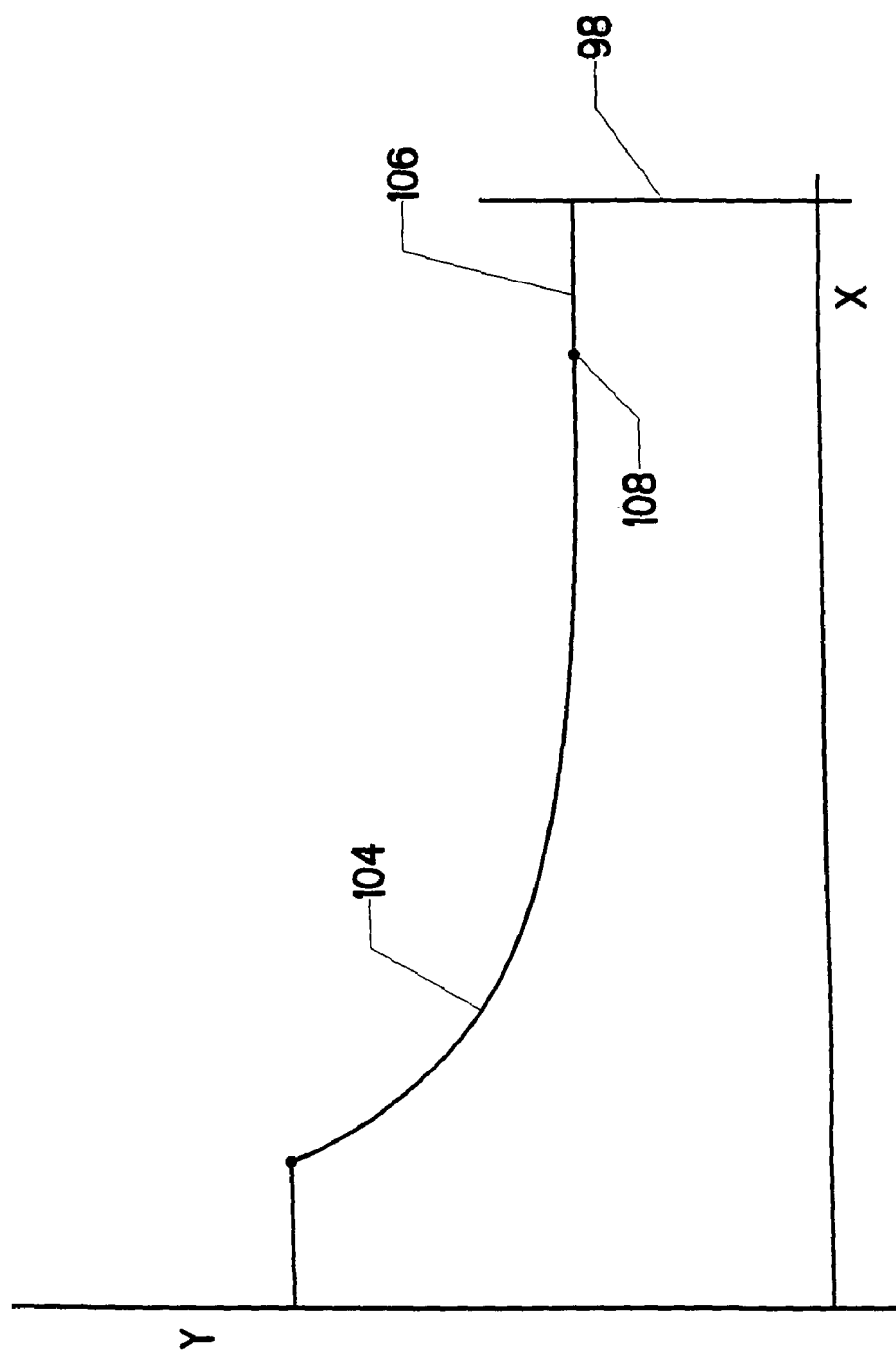
FIG. 27 is a plot view, showing a parabolic approximation.
Figure 28:
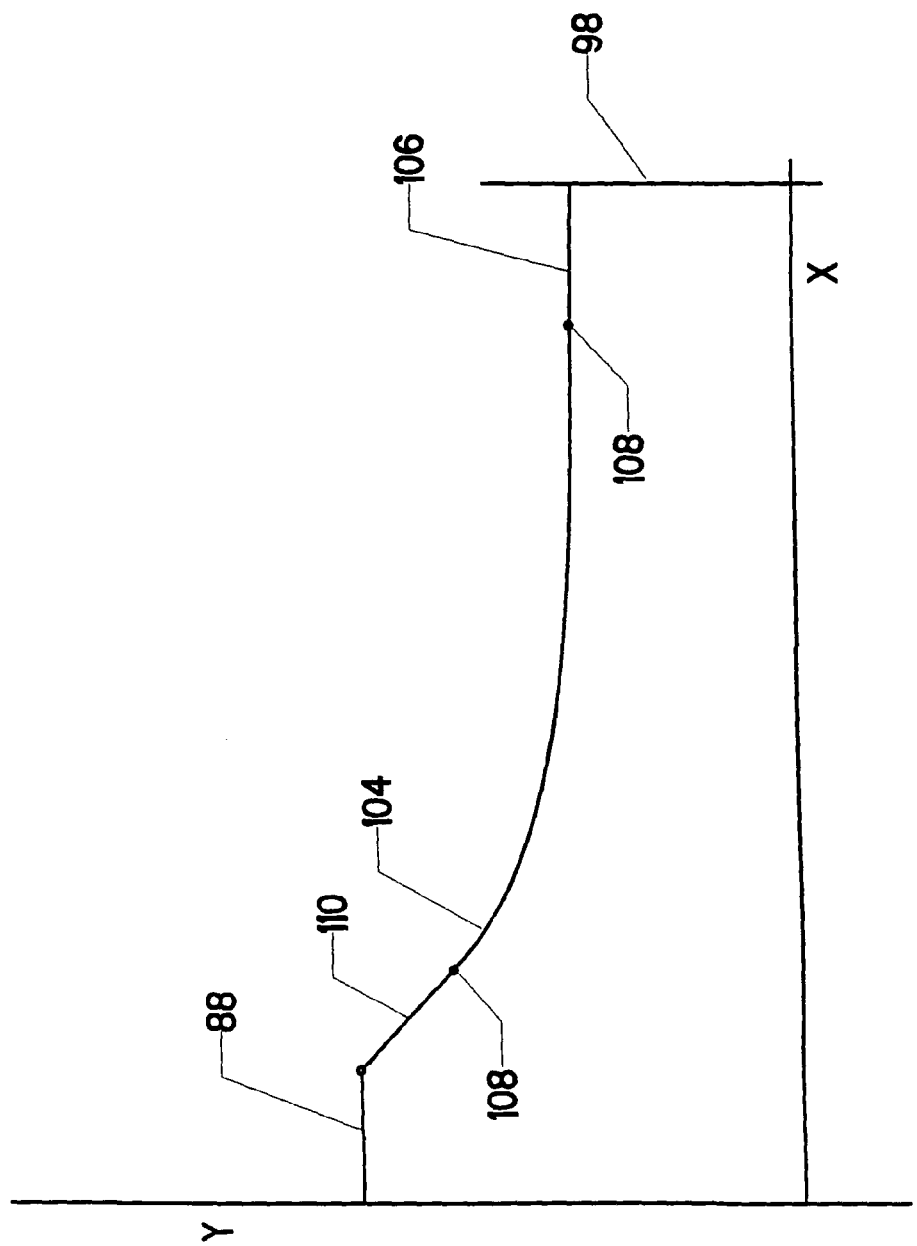
FIG. 28 is a plot view, showing a parabolic approximation.

As a first example, a constrained parabolic curve can be used to approximate the optimized composite curve. FIG. 27 shows such a curve. A straight neck portion 106 is placed proximate neck anchor boundary 98. This straight portion is cotangent (or nearly so) with parabolic curve 104 at tangency point 108. Proceeding from right to left in the view, the slope of parabolic curve 104 (a second order curve) increases non-linearly until it intersects diameter boundary 88. This combination roughly approximates the optimized composite curve. As for the prior example, a fillet can be provided between diameter boundary 88 and parabolic curve 104 (true for all cases where the diameter boundary is used). FIG. 28 shows an example having straight portions at both ends of the parabolic curve. Straight conic portion 110 is added on the expanding end of parabolic curve 104. It is cotangent (or nearly so) to the parabolic curve at a second tangency point 108 (the left point in the view). Straight neck portion 106 is retained in this example.

Figure 29:
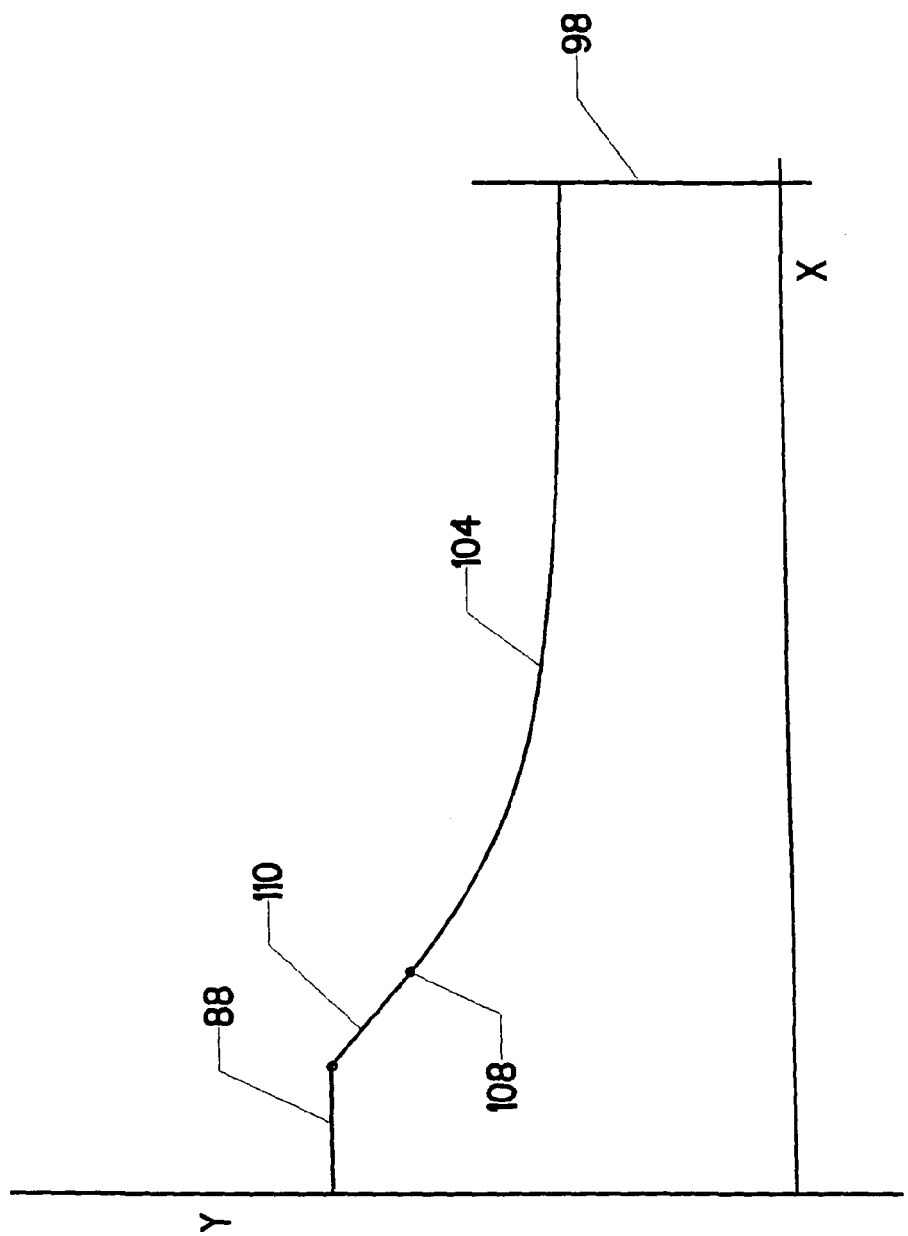
FIG. 29 is a plot view, showing a parabolic approximation.

FIG. 29 shows a third example retaining straight conic portion 110 but deleting straight neck portion 106. In this case, it is advisable to select a parabolic curve whose slope is nearly zero at neck anchor boundary 98.

In all these parabolic examples (FIGS. 27-29) it is important to select the constants so that the parabolic curve, in combination with the one or more straight portions, most closely approximates the optimized composite curve. If the optimized composite curve assumes the form $y = A \cdot e^{-Bx} + D \cdot x + E$, then the constants for the parabolic curve must be selected to most closely follow that relationship over a range of x values, so that the advantage of the area ratio relationship can be realized.

Figure 30:
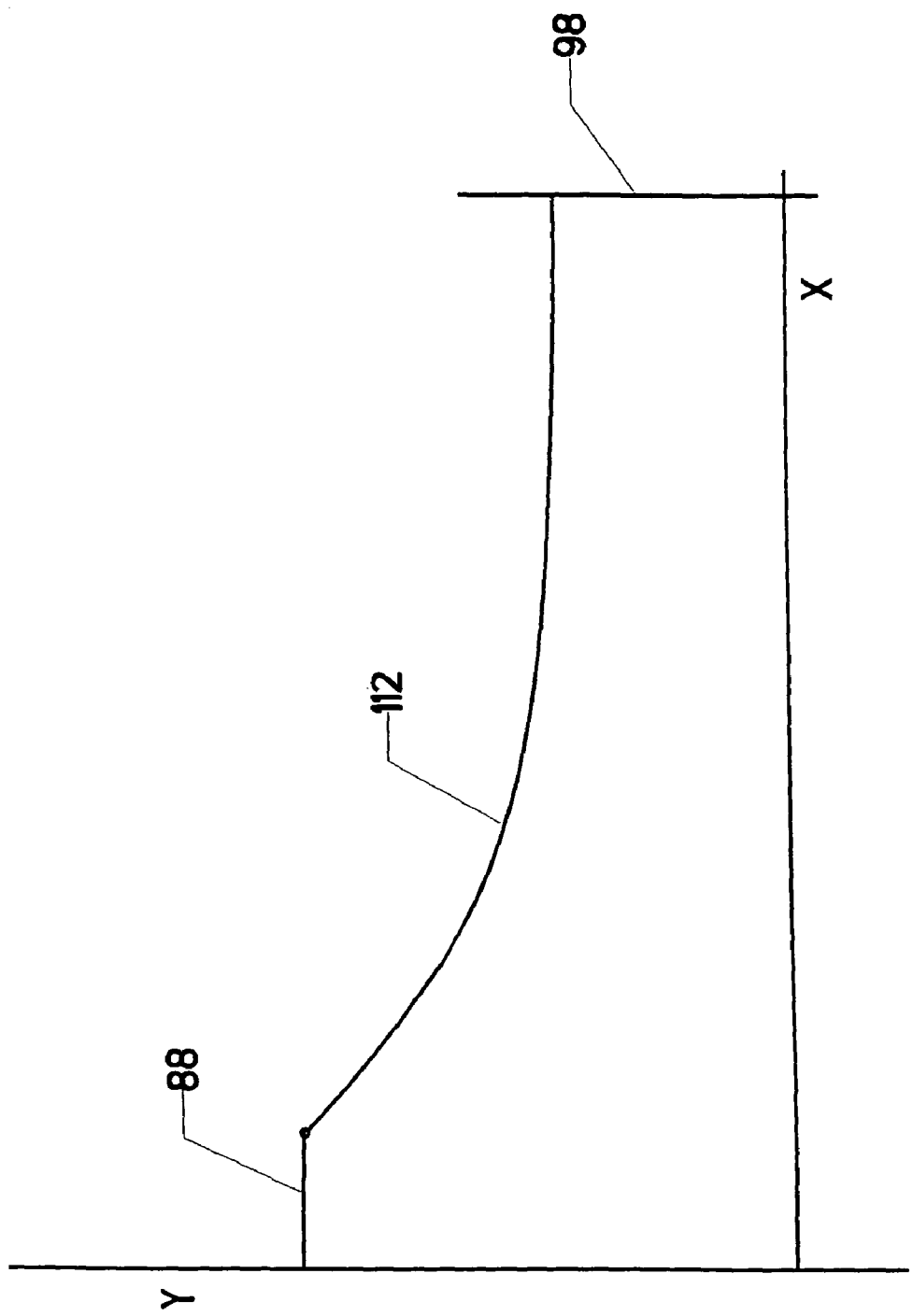
FIG. 30 is a plot view, showing a higher order approximation.

Of course, a better fit can be obtained by using higher order curves. In this disclosure, the term "higher order curve" will be understood to mean a polynomial of at least the third order. Thus, fourth order polynomials and fifth order polynomials would be encompassed by this term. FIG. 30 shows an example using such a higher order polynomial. Higher order composite curve 112 extends from neck anchor boundary 98 to diameter boundary 88. The coefficients for the higher order composite curve are selected so that the slope is zero or fairly small in the region of neck anchor boundary 98.

Figure 31:
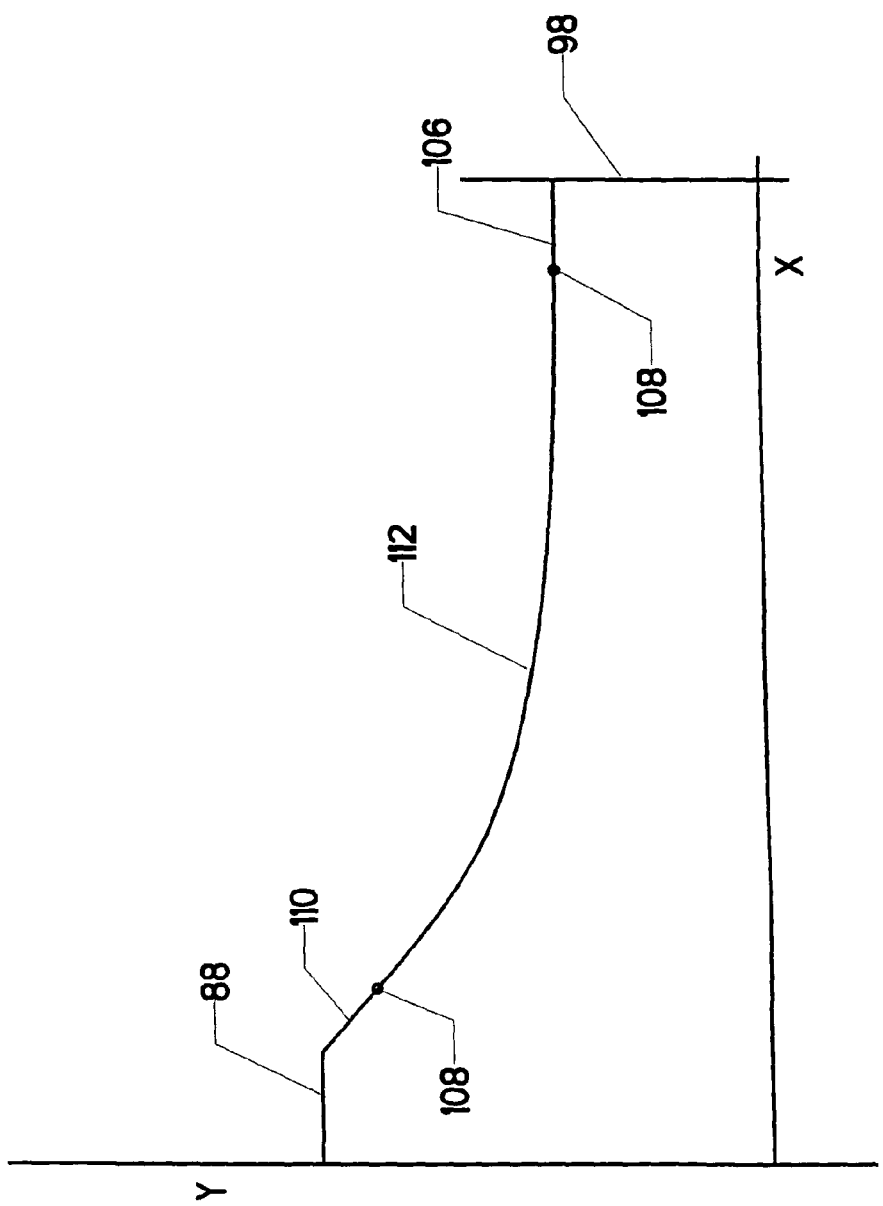
FIG. 31 is a plot view, showing a higher order approximation.

In FIG. 31, the higher order composite curve has been combined with a straight neck portion 106 and a straight conic portion 110. The intersections are tangent—or nearly tangent—at tangency points 108. It is also possible to use the higher order composite curve in combination with only one of the straight portions.

Figure 32:
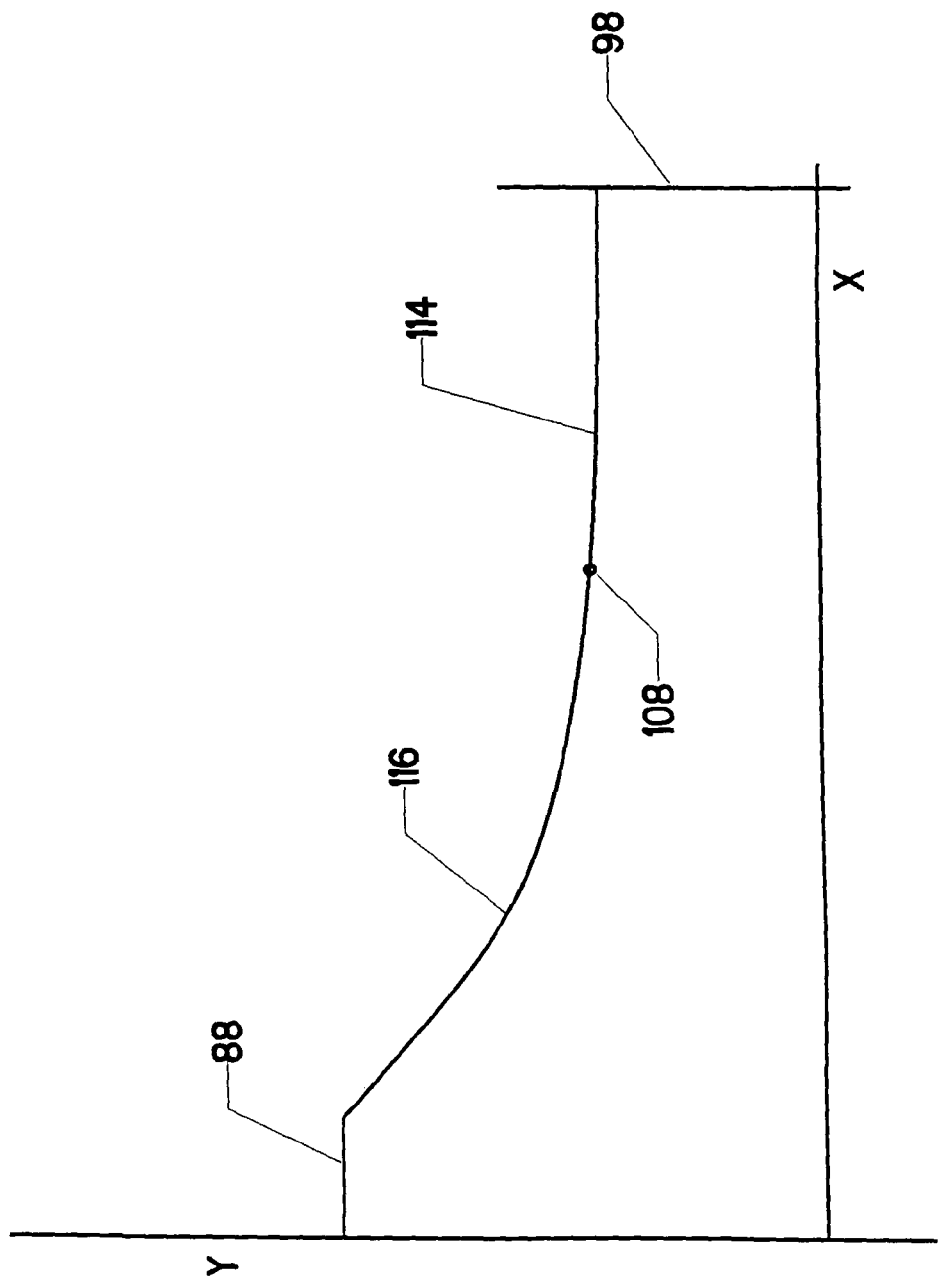
FIG. 32 is a plot view, showing two parabolas used to create an approximation.

Although second order (parabolic) curves provide a relatively poor fit for the area ratio function, using two cotangent second order curves can improve the fit considerably. FIG. 32 shows this arrangement. The wall profile includes first parabolic curve 14 and second parabolic curve 116. The two parabolic curves are tangent at tangency point 108. The coefficients for the first parabolic curve are selected to produce a flatter curve than second parabolic curve 116. This combination more accurately mimics the area ratio function.

Figure 33:
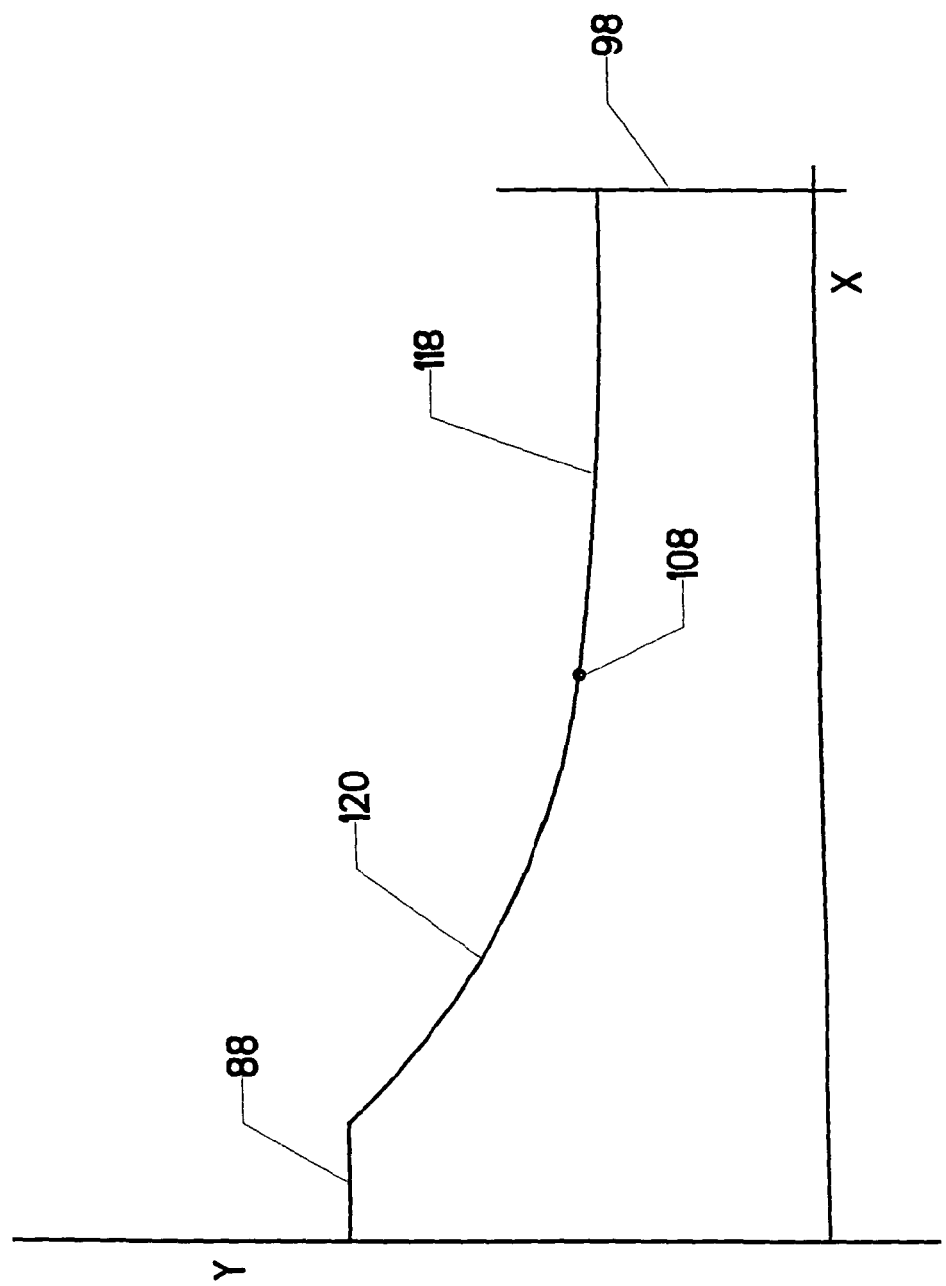
FIG. 33 is a plot view, showing two arcs used to create an approximation.

Even simple arcs (constant radius curves) can perform reasonably well if two or more arcs are used in the wall profile. FIG. 33 shows such a wall profile. First arc 118 is tangent to second arc 120 at tangency point 108. The radius for the first arc is larger than that for the second. The reader will observe that the overall profile is a reasonable approximation of the modified area ratio curve.

The reader will therefore generally understand a termination created according to the present invention as having these characteristics for the wall profile in its internal passage: An idealized wall profile created from a first curve based on an area-ratio-function, optionally modified by a second curve which accounts for other factors (such as tensile stress). The idealized wall profile itself can be used to manufacture a part.

If such complexity is impractical, then simpler geometry (arc, parabolas, etc.) can be used to approximate the idealized wall profile.

Although the preceding description contains significant detail, it should not be construed as limiting the scope of the invention but rather as providing illustrations of the preferred embodiments of the invention. As an example, the wall profile features described in the disclosure could be mixed and combined to form many more permutations than those illustrated. The claims language to follow describes many profiles in terms of precise mathematical functions. Those skilled in the art will know that when actual parts are manufactured, these mathematical functions will be approximated and not recreated exactly. Thus, the language used in the claims is intended to describe the general nature of the wall profiles. It will be understood that physical examples of anchors falling under the claims may deviate somewhat from the precise mathematical equations.

Having described our invention, we claim:

1. An anchor for use in creating a termination on a cable, comprising:
   a. a neck anchor boundary;
   b. a distal anchor boundary;
   c. a central axis;
   d. a passage extending along said central axis from said neck anchor boundary to said distal anchor boundary;
   e. wherein said passage is defined by a revolved wall profile;
   f. wherein said wall profile is created by adding a first set of radius values produced by a first curve and a second set of radius values produced by a second curve to form a third set of radius values defining a composite curve;
   g. wherein a Cartesian coordinate system is defined with an x-axis lying along said central axis, an origin lying distal to said neck anchor boundary in the direction of said distal anchor boundary, and a y-axis being perpendicular to said x-axis so that said radius values correspond to the variable y and the distance along said central axis from said origin corresponds to the variable x;
   h. wherein at each point along said x-axis said composite curve has a slope, with a negative slope being defined as one which causes said passage to shrink when proceeding in the direction from said distal anchor boundary to said neck anchor boundary;
   i. wherein said first curve is an area ratio function having a negative slope proximate said neck anchor boundary and having an increasingly negative slope proceeding toward said distal anchor boundary, said area ratio function assuming the form $y=Ae^{-Bx}$;
   j. wherein said second curve is a tensile stress modifier curve having a positive slope, said tensile stress modifier curve assuming the form $y=Dx+E$; and
   k. wherein parameters defining said area ratio function and said tensile stress modifier curve are selected so that at said neck anchor boundary said radius of said composite curve is approximately equal to the radius of said cable and said slope of said composite curve is approximately zero.

2. An anchor as recited in claim 1, wherein said passage further comprises a portion having a fixed diameter, with said fixed diameter portion comprising the portion of said passage which extends to said distal anchor boundary.

3. An anchor as recited in claim 2, wherein said fixed diameter portion and said composite curve are joined by a fillet.

4. An anchor as recited in claim 3, wherein at the extreme of said composite curve lying closest to said distal anchor boundary, said radius value produced by said tensile stress modifier curve is negative.

5. An anchor as recited in claim 2, wherein at the extreme of said composite curve lying closest to said distal anchor boundary, said radius value produced by said tensile stress modifier curve is negative.

6. An anchor as recited in claim 1, wherein at said neck anchor boundary said radius value produced by said area ratio function is approximately equal to said radius value produce by said tensile stress modifier curve.

7. An anchor as recited in claim 6, wherein in a region of said passage lying approximately midway between said neck anchor boundary and said distal anchor boundary, said radius value produced by said area ratio function is substantially larger than said radius value produced by said tensile stress modifier curve.

8. An anchor as recited in claim 7, wherein said passage further comprises a portion having a fixed diameter, with said fixed diameter portion comprising the portion of said passage which extends to said distal anchor boundary.

9. An anchor as recited in claim 8, wherein said fixed diameter portion and said composite curve are joined by a fillet.

10. An anchor as recited in claim 9, wherein at the extreme of said composite curve lying closest to said distal anchor boundary, said radius value produced by said tensile stress modifier curve is negative.

11. An anchor as recited in claim 8, wherein at the extreme of said composite curve lying closest to said distal anchor boundary, said radius value produced by said tensile stress modifier curve is negative.

12. An anchor as recited in claim 7, wherein at the extreme of said composite curve lying closest to said distal anchor boundary, said radius value produced by said tensile stress modifier curve is negative.

13. An anchor as recited in claim 6, wherein at the extreme of said composite curve lying closest to said distal anchor boundary, said radius value produced by said tensile stress modifier curve is negative.

14. An anchor as recited in claim 1, wherein:
   a. at said neck anchor boundary said slope of said area ratio function is greater than five degrees; and
   b. at the extreme of said composite curve lying closest to said distal anchor boundary, said slope of said area ratio function is greater than thirty degrees.

15. An anchor as recited in claim 14, wherein said passage further comprises a portion having a fixed diameter, with said fixed diameter portion comprising the portion of said passage which extends to said distal anchor boundary.

16. An anchor as recited in claim 15, wherein said fixed diameter portion and said composite curve are joined by a fillet.

17. An anchor as recited in claim 16, wherein at the extreme of said composite curve lying closest to said distal anchor boundary, said radius value produced by said tensile stress modifier curve is negative.

18. An anchor as recited in claim 15, wherein at the extreme of said composite curve lying closest to said distal anchor boundary, said radius value produced by said tensile stress modifier curve is negative.

19. An anchor as recited in claim 14, wherein at the extreme of said composite curve lying closest to said distal anchor boundary, said radius value produced by said tensile stress modifier curve is negative.

20. An anchor as recited in claim 1, wherein at the extreme of said composite curve lying closest to said distal anchor boundary, said radius value produced by said tensile stress modifier curve is negative.

* * * * *